(12) United States Patent
Suishu et al.

(10) Patent No.: US 7,447,855 B2
(45) Date of Patent: *Nov. 4, 2008

(54) DATA PROCESSING METHOD PROVIDING REMOTE COPY IN A SYSTEM HAVING FIRST, SECOND, AND THIRD STORAGE SYSTEMS

(75) Inventors: Kazuhito Suishu, Odawara (JP); Yusuke Hirakawa, Odawara (JP); Yoshihiro Asaka, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/581,413

(22) Filed: Oct. 17, 2006

(65) Prior Publication Data

US 2007/0038824 A1  Feb. 15, 2007

Related U.S. Application Data

(60) Continuation of application No. 11/334,511, filed on Jan. 19, 2006, now Pat. No. 7,143,254, which is a division of application No. 10/784,356, filed on Feb. 23, 2004, now Pat. No. 7,130,975.

(30) Foreign Application Priority Data

Sep. 9, 2003 (JP) ............................. 2003-316183

(51) Int. Cl.
  G06F 12/00 (2006.01)
  G06F 13/00 (2006.01)
  G06F 12/16 (2006.01)

(52) U.S. Cl. .................... 711/162; 711/114; 711/161; 714/6; 714/20; 707/202; 707/204

(58) Field of Classification Search ................ 711/162
See application file for complete search history.

(56) References Cited

U.S. PATENT DOCUMENTS 3,173,377 A  3/1965 Lee (Continued)

FOREIGN PATENT DOCUMENTS

EP  0902370  3/1999

(Continued)

OTHER PUBLICATIONS

"Replication Guide and Reference V8: Document No. SC27-1121-01", IBM DB Guide, 2003, 789 pages.

(Continued)

Primary Examiner—Matt Kim
Assistant Examiner—Michael C Krofcheck
(74) Attorney, Agent, or Firm—Mattingly, Stanger, Malur & Brundidge, P.C.

(57) ABSTRACT

A data processing system includes at least a first storage system, a second storage system and a third storage system. The third storage system maintains a replication of data stored in the first storage system. When updating data in the first storage system, the first storage system updates the replication of data stored in the third storage system and creates a journal. The journal is formed from a copy of data used for update and update information such as a write command for update, etc. The second storage system also maintains a replication of data stored in the first storage system. The second storage system obtains the journal, and updates data stored therein corresponding to data stored in the first storage system in the order of data update performed in the first storage system. When updating data stored in the third storage system corresponding to data stored in the first storage system, the third storage system creates a journal using data update numbers created in the first storage system. When the first storage system fails, the second storage system obtains the journal from the third storage system, and updates data stored therein corresponding to data stored in the first storage system in the order of data update performed in the first storage system.

19 Claims, 35 Drawing Sheets

U.S. PATENT DOCUMENTS

| | | | |
|---|---|---|---|
| 5,155,845 A | 10/1992 | Beal et al. | |
| 5,170,480 A | 12/1992 | Mohan et al. | |
| 5,307,481 A | 4/1994 | Shimazaki et al. | |
| 5,379,418 A | 1/1995 | Shimazaki et al. | |
| 5,459,857 A | 10/1995 | Ludlam et al. | |
| 5,544,347 A | 8/1996 | Yanai et al. | |
| 5,555,371 A | 9/1996 | Duyanovich et al. | |
| 5,720,029 A | 2/1998 | Kern et al. | |
| 5,734,818 A | 3/1998 | Kern et al. | |
| 5,742,792 A | 4/1998 | Yanai et al. | |
| 5,799,323 A | 8/1998 | Mosher, Jr. et al. | |
| 5,835,953 A | 11/1998 | Ohran | |
| 5,901,327 A | 5/1999 | Ofek | |
| 5,933,653 A | 8/1999 | Ofek | |
| 5,974,563 A | 10/1999 | Beeler, Jr. | |
| 5,995,980 A | 11/1999 | Olson et al. | |
| 6,044,444 A | 3/2000 | Ofek | |
| 6,052,758 A | 4/2000 | Crockett et al. | |
| 6,092,066 A | 7/2000 | Ofek | |
| 6,101,497 A | 8/2000 | Ofek | |
| 6,148,383 A | 11/2000 | Micka et al. | |
| 6,157,991 A | 12/2000 | Arnon | |
| 6,173,377 B1 | 1/2001 | Yanai et al. | |
| 6,178,427 B1 | 1/2001 | Parker | |
| 6,209,002 B1 | 3/2001 | Gagne et al. | |
| 6,282,610 B1 | 8/2001 | Bergsten | |
| 6,308,283 B1 | 10/2001 | Galipeau et al. | |
| 6,324,654 B1 | 11/2001 | Wahl et al. | |
| 6,360,306 B1 | 3/2002 | Bergsten | |
| 6,363,462 B1 | 3/2002 | Bergsten | |
| 6,393,538 B2 | 5/2002 | Murayama | |
| 6,397,307 B2 | 5/2002 | Ohran | |
| 6,408,370 B2 | 6/2002 | Yamamoto et al. | |
| 6,442,706 B1 | 8/2002 | Wahl et al. | |
| 6,446,176 B1 | 9/2002 | West et al. | |
| 6,460,055 B1 | 10/2002 | Midgley et al. | |
| 6,463,501 B1 | 10/2002 | Kem et al. | |
| 6,467,034 B1 | 10/2002 | Yanaka | |
| 6,477,627 B1 | 11/2002 | Ofek | |
| 6,487,645 B1 | 11/2002 | Clark et al. | |
| 6,496,908 B1 | 12/2002 | Kamvysselis et al. | |
| 6,526,487 B2 | 2/2003 | Ohran et al. | |
| 6,622,152 B1 | 9/2003 | Sinn et al. | |
| 6,625,623 B1 | 9/2003 | Midgley et al. | |
| 6,662,197 B1 | 12/2003 | LeCrone et al. | |
| 6,804,676 B1 | 10/2004 | Bains | |
| 6,883,112 B2 | 4/2005 | Maeda et al. | |
| 6,941,322 B2 | 9/2005 | Bills et al. | |
| 6,959,369 B1 | 10/2005 | Ashton et al. | |
| 6,968,349 B2 | 11/2005 | Owen et al. | |
| 2001/0029570 A1 | 10/2001 | Yamamoto et al. | |
| 2002/0133511 A1 | 9/2002 | Hostetter et al. | |
| 2002/0143888 A1 | 10/2002 | Lisiecki et al. | |
| 2003/0014432 A1 | 1/2003 | Teloh et al. | |
| 2003/0014433 A1 | 1/2003 | Teloh et al. | |
| 2003/0051111 A1 | 3/2003 | Nakano | |
| 2003/0074378 A1 | 4/2003 | Midgley et al. | |
| 2003/0074600 A1 | 4/2003 | Tamatsu | |
| 2003/0084075 A1 | 5/2003 | Balogh et al. | |
| 2003/0167312 A1* | 9/2003 | Mori | 709/212 |
| 2003/0204479 A1 | 10/2003 | Bills et al. | |
| 2003/0217031 A1 | 11/2003 | Owen et al. | |
| 2003/0220935 A1 | 11/2003 | Vivian et al. | |
| 2003/0229764 A1 | 12/2003 | Ohno et al. | |
| 2004/0024975 A1* | 2/2004 | Morishita et al. | 711/147 |
| 2004/0030703 A1 | 2/2004 | Bourbonnais et al. | |
| 2004/0059738 A1 | 3/2004 | Tarbell | |
| 2005/0038968 A1 | 2/2005 | Iwamura et al. | |
| 2005/0050115 A1 | 3/2005 | Kekre | |

FOREIGN PATENT DOCUMENTS

| | | |
|---|---|---|
| EP | 1283469 | 2/2003 |
| JP | 62-274448 | 11/1987 |
| JP | 02-037418 | 2/1990 |
| JP | 07-191811 | 7/1995 |
| JP | 7-244597 | 9/1995 |
| WO | 00/49500 | 8/2000 |

OTHER PUBLICATIONS

"IBM DB2 RepliData for z/OS, Version 3.1", IBM DB2 Guide, Mar. 2003, 2 pages.

Lyon, Jim, "Tandem's Remote Data Facility", Tandem Computers Inc., 1990 IIEE, pp. 562-567.

IBM DB2 DataPropagator for z/OS, Version 8.1, IBM DB2 Guide, 2002, 4 pp.

Replication Guide and Reference V7: Document No. SC26-9920-00, IBM DB2 Guide, 2000, 455 pages.

* cited by examiner

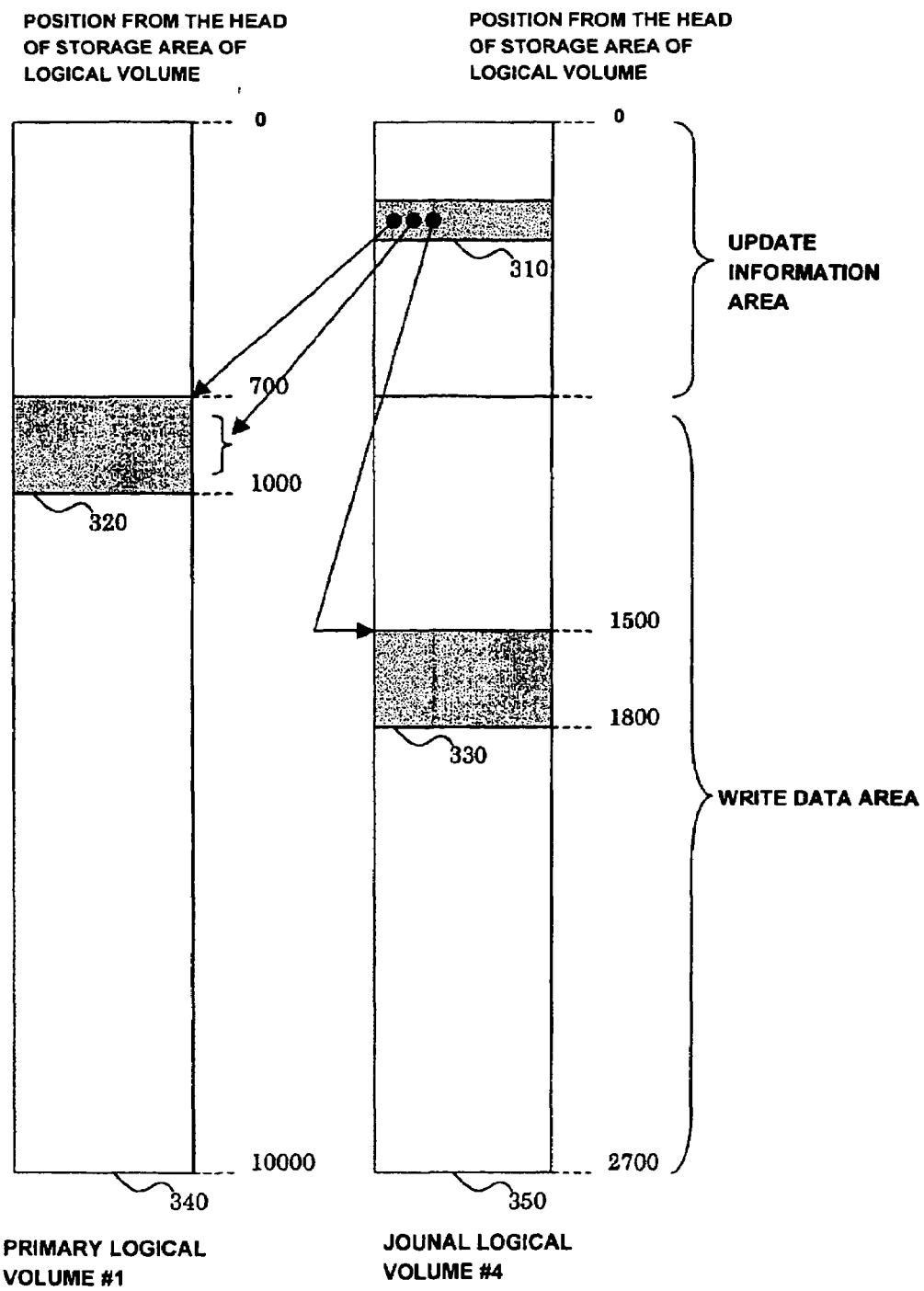

FIG. 4

| LOGICAL VOLUME NUMBER | VOLUME STATE | FORMAT | CAPA-CITY | SYNC PAIR NUMBER | ASYNC PAIR NUMBER | PHYSICAL ADDRESS | |
|---|---|---|---|---|---|---|---|
| | | | | | | STORAGE DEVICE NUMBER | POSITION FROM THE HEAD |
| 1 | PRIMARY | OPEN3 | 3 | 3 | 1 | 1 | 0 |
| 2 | PRIMARY | OPEN6 | 6 | 4 | 2 | 1 | 3 |
| 3 | BLANK | OPEN6 | 6 | 0 | 0 | 1 | 9 |
| 4 | NORMAL | OPEN9 | 9 | 0 | 0 | 2 | 0 |
| 5 | NORMAL | OPEN3 | 3 | 0 | 0 | 2 | 9 |
| 6 | BLANK | OPEN6 | 6 | 0 | 0 | 2 | 12 |

400 VOLUME INFORMATION

FIG. 5

| PAIR NUMBER | PAIR STATE | PRIMARY STORAGE SYSTEM NUMBER | PRIMARY LOGICAL VOLUME NUMBER | SECONDARY STORAGE SYSTEM NUMBER | SECONDARY LOGICAL VOLUME NUMBER | GROUP NUMBER | COPY COMPLETED ADDRESS |
|---|---|---|---|---|---|---|---|
| 1 | NORMAL | A | 1 | B | 1 | 1 | 0 |
| 2 | NORMAL | A | 2 | B | 2 | 1 | 0 |
| 3 | NORMAL | A | 1 | C | 1 | 2 | 0 |
| 4 | NORMAL | A | 2 | C | 2 | 2 | 0 |
| 5 | BLANK | 0 | 0 | 0 | 0 | 0 | 0 |

500 PAIR INFORMATION

FIG. 6

| GROUP NUMBER | GROUP STATE | PAIR SET | JOURNAL LOGICAL VOLUME NUMBER | UPDATE NUMBER | REPLI-CATION TYPE | PARTNER STORAGE SYSTEM NUMBER | PARTNER GROUP NUMBER |
|---|---|---|---|---|---|---|---|
| 1 | NORMAL | 1,2 | 4 | 5 | ASYNC | B | 1 |
| 2 | NORMAL | 3,4 | 0 | 0 | SYNC | C | 1 |

600 GROUP INFORMATION

FIG. 7

| | LOGICAL ADDRESS | |
|---|---|---|
| | LOGICAL VOLUME NUMBER | POSITION FROM THE HEAD OF STORAGE AREA OF LOGICAL |
| UPDATE INFORMATION AREA HEAD ADDRESS | 4 | 0 |
| WRITE DATA AREA HEAD ADDRESS | 4 | 700 |
| UPDATE INFORMATION LATEST ADDRESS | 4 | 500 |
| UPDATE INFORMATION OLDEST ADDRESS | 4 | 200 |
| WRITE DATA LATEST ADDRESS | 4 | 2200 |
| WRITE DATA OLDEST ADDRESS | 4 | 1300 |
| READ INITIATION ADDRESS | 4 | 400 |
| RETRY INITIATION ADDRESS | 4 | 300 |

700 POINTER INFORMATION

FIG. 21

| SETTING ITEMS | EXAMPLE OF SET VALUES |
|---|---|
| TIME WHEN WRITE COMMAND IS RECEIVED | 1999/3/17 22:20:10 |
| GROUP NUMBER | 1 |
| UPDATE NUMBER | 4 |
| LOGICAL ADDRESS OF WRITE COMMAND | LOGICAL VOLUME NUMBER: 1<br>POSITION FROM HEAD OF STORAGE AREA OF LOGICAL VOLUME : 700 |
| DATA SIZE OF WRITE DATA | 300 |
| LOGICAL ADDRESS OF JOURNAL LOGICAL VOLUME THAT STORES WRITE DATA | LOGICAL VOLUME NUMBER: 4<br>POSITION FROM HEAD OF STORAGE AREA OF LOGICAL VOLUME : 1500 |

310 UPDATE INFORMATION

FIG. 22

| SETTING ITEMS | EXAMPLE OF SET VALUES |
|---|---|
| TIME WHEN WRITE COMMAND IS RECEIVED | 1999/3/17 22:22:10 |
| GROUP NUMBER | 1 |
| UPDATE NUMBER | 5 |
| LOGICAL ADDRESS OF WRITE COMMAND | LOGICAL VOLUME NUMBER: 1<br>POSITION FROM HEAD OF STORAGE AREA OF LOGICAL VOLUME : 800 |
| DATA SIZE OF WRITE DATA | 100 |
| LOGICAL ADDRESS OF JOURNAL LOGICAL VOLUME THAT STORES WRITE DATA | LOGICAL VOLUME NUMBER: 4<br>POSITION FROM HEAD OF STORAGE AREA OF LOGICAL VOLUME : 2200 |

FIG. 26

| LOGICAL VOLUME NUMBER | VOLUME STATE | FORMAT | CAPA-CITY | SYNC PAIR NUMBER | ASYNC PAIR NUMBER | PHYSICAL ADDRESS ||
|---|---|---|---|---|---|---|---|
| | | | | | | STORAGE DEVICE NUMBER | POSITION FROM THE HEAD |
| 1 | SECONDARY | OPEN3 | 3 | 0 | 1 | 1 | 0 |
| 2 | SECONDARY | OPEN6 | 6 | 0 | 2 | 1 | 3 |
| 3 | NORMAL | OPEN9 | 9 | 0 | 0 | 2 | 0 |

FIG. 27

| PAIR NUMBER | PAIR STATE | PRIMARY STORAGE SYSTEM NUMBER | PRIMARY LOGICAL VOLUME NUMBER | SECONDARY STORAGE SYSTEM NUMBER | SECONDARY LOGICAL VOLUME NUMBER | GROUP NUMBER | COPY COMPLETED ADDRESS |
|---|---|---|---|---|---|---|---|
| 1 | NORMAL | A | 1 | B | 1 | 1 | 0 |
| 2 | NORMAL | A | 2 | B | 2 | 1 | 0 |
| 3 | BLANK | 0 | 0 | 0 | 0 | 0 | 0 |

FIG. 28

| GROUP NUMBER | GROUP STATE | PAIR SET | JOURNAL LOGICAL VOLUME NUMBER | UPDATE NUMBER | REPLI-CATION TYPE | PARTNER STORAGE SYSTEM NUMBER | PARTNER GROUP NUMBER |
|---|---|---|---|---|---|---|---|
| 1 | NORMAL | 1,2 | 3 | 4 | ASYNC | A | 1 |
| 2 | BLANK | 0 | 0 | 0 | 0 | 0 | 0 |

FIG. 29

| | LOGICAL ADDRESS | |
|---|---|---|
| | LOGICAL VOLUME NUMBER | POSITION FROM THE HEAD OF STORAGE AREA OF LOGICAL VOLUME |
| UPDATE INFORMATION AREA HEAD ADDRESS | 3 | 0 |
| WRITE DATA AREA HEAD ADDRESS | 3 | 700 |
| UPDATE INFORMATION LATEST ADDRESS | 3 | 400 |
| UPDATE INFORMATION OLDEST ADDRESS | 3 | 200 |
| WRITE DATA LATEST ADDRESS | 3 | 2000 |
| WRITE DATA OLDEST ADDRESS | 3 | 1300 |
| READ INITIATION ADDRESS | 3 | 0 |
| RETRY INITIATION ADDRESS | 3 | 0 |

FIG. 31

| LOGICAL VOLUME NUMBER | VOLUME STATE | FORMAT | CAPA-CITY | SYNC PAIR NUMBER | ASYNC PAIR NUMBER | PHYSICAL ADDRESS | |
|---|---|---|---|---|---|---|---|
| | | | | | | STORAGE DEVICE NUMBER | POSITION FROM THE HEAD |
| 1 | SECONDARY | OPEN3 | 3 | 1 | 0 | 1 | 0 |
| 2 | SECONDARY | OPEN6 | 6 | 2 | 0 | 1 | 3 |
| 3 | NORMAL | OPEN9 | 9 | 0 | 0 | 2 | 0 |

FIG. 32

| PAIR NUMBER | PAIR STATE | PRIMARY STORAGE SYSTEM NUMBER | PRIMARY LOGICAL VOUME NUMBER | SECONDARY STORAGE SYSTEM NUMBER | SECONDARY LOGICAL VOUME NUMBER | GROUP NUMBER | COPY COMP-LETED ADDRESS |
|---|---|---|---|---|---|---|---|
| 1 | NORMAL | A | 1 | C | 1 | 1 | 0 |
| 2 | NORMAL | A | 2 | C | 2 | 1 | 0 |
| 3 | BLANK | 0 | 0 | 0 | 0 | 0 | 0 |
| 3 | BLANK | 0 | 0 | 0 | 0 | 0 | 0 |

FIG. 33

| GROUP NUMBER | GROUP STATE | PAIR SET | JOURNAL LOGICAL VOLUME NUMBER | UPDATE NUMBER | REPLICATION TYPE | PARTNER STORAGE SYSTEM NUMBER | PARTNER GROUP NUMBER |
|---|---|---|---|---|---|---|---|
| 1 | NORMAL | 1,2 | 3 | 5 | SYNC | A | 2 |
| 2 | BLANK | 0 | 0 | 0 | 0 | 0 | 0 |

FIG. 34

| | LOGICAL ADDRESS | |
|---|---|---|
| | LOGICAL VOLUME NUMBER | POSITION FROM THE HEAD OF STORAGE AREA OF LOGICAL VOLUME |
| UPDATE INFORMATION AREA HEAD ADDRESS | 3 | 0 |
| WRITE DATA AREA HEAD ADDRESS | 3 | 700 |
| UPDATE INFORMATION LATEST ADDRESS | 3 | 500 |
| UPDATE INFORMATION OLDEST ADDRESS | 3 | 0 |
| WRITE DATA LATEST ADDRESS | 3 | 2200 |
| WRITE DATA OLDEST ADDRESS | 3 | 700 |
| READ INITIATION ADDRESS | 3 | 0 |
| RETRY INITIATION ADDRESS | 3 | 0 |

FIG. 36

| PAIR NUMBER | PAIR STATE | PRIMARY STORAGE SYSTEM NUMBER | PRIMARY LOGICAL VOUME NUMBER | SECONDARY STORAGE SYSTEM NUMBER | SECONDARY LOGICAL VOUME NUMBER | GROUP NUMBER | COPY COMPLETED ADDRESS |
|---|---|---|---|---|---|---|---|
| 1 | NORMAL | C | 1 | B | 1 | 1 | 0 |
| 2 | NORMAL | C | 2 | B | 2 | 1 | 0 |
| 3 | BLANK | 0 | 0 | 0 | 0 | 0 | 0 |

FIG. 37

| GROUP NUMBER | GROUP STATE | PAIR SET | JOURNAL LOGICAL VOLUME NUMBER | UPDATE NUMBER | REPLICATION TYPE | PARTNER STORAGE SYSTEM NUMBER | PARTNER GROUP NUMBER |
|---|---|---|---|---|---|---|---|
| 1 | HALTED | 1,2 | 3 | 4 | ASYNC | C | 2 |
| 2 | BLANK | 0 | 0 | 0 | 0 | 0 | 0 |

FIG. 38

| LOGICAL VOLUME NUMBER | VOLUME STATE | FORMAT | CAPA-CITY | SYNC PAIR NUMBER | ASYNC PAIR NUMBER | PHYSICAL ADDRESS ||
|---|---|---|---|---|---|---|---|
| | | | | | | STORAGE DEVICE NUMBER | POSITION FROM THE HEAD |
| 1 | PRIMARY | OPEN3 | 3 | 1 | 3 | 1 | 0 |
| 2 | PRIMARY | OPEN6 | 6 | 2 | 4 | 1 | 3 |
| 3 | NORMAL | OPEN9 | 9 | 0 | 0 | 2 | 0 |

FIG. 39

| PAIR NUMBER | PAIR STATE | PRIMARY STORAGE SYSTEM NUMBER | PRIMARY LOGICAL VOLUME NUMBER | SECONDARY STORAGE SYSTEM NUMBER | SECONDARY LOGICAL VOLUME NUMBER | GROUP NUMBER | COPY COMPLETED ADDRESS |
|---|---|---|---|---|---|---|---|
| 1 | ABNORMAL | A | 1 | C | 1 | 1 | 0 |
| 2 | ABNORMAL | A | 2 | C | 2 | 1 | 0 |
| 3 | NORMAL | C | 1 | B | 1 | 1 | 0 |
| 4 | NORMAL | C | 2 | B | 2 | 1 | 0 |

FIG. 40

| GROUP NUMBER | GROUP STATE | PAIR SET | JOURNAL LOGICAL VOLUME NUMBER | UPDATE NUMBER | REPLICATION TYPE | PARTNER STORAGE SYSTEM NUMBER | PARTNER GROUP NUMBER |
|---|---|---|---|---|---|---|---|
| 1 | ABNORMAL | 1,2 | 0 | 5 | SYNC | A | 2 |
| 2 | NORMAL | 3,4 | 3 | 5 | ASYNC | B | 1 |

FIG. 41

|  | LOGICAL ADDRESS | |
| --- | --- | --- |
|  | LOGICAL VOLUME NUMBER | POSITION FROM THE HEAD OF STORAGE AREA OF LOGICAL |
| UPDATE INFORMATION AREA HEAD ADDRESS | 3 | 0 |
| WRITE DATA AREA HEAD ADDRESS | 3 | 700 |
| UPDATE INFORMATION LATEST ADDRESS | 3 | 500 |
| UPDATE INFORMATION OLDEST ADDRESS | 3 | 400 |
| WRITE DATA LATEST ADDRESS | 3 | 2200 |
| WRITE DATA OLDEST ADDRESS | 3 | 2000 |
| READ INITIATION ADDRESS | 3 | 400 |
| RETRY INITIATION ADDRESS | 3 | 400 |

FIG. 43

| PAIR NUMBER | PAIR STATE | PRIMARY STORAGE SYSTEM NUMBER | PRIMARY VOLUME NUMBER | SECONDARY STORAGE SYSTEM NUMBER | SECONDARY VOLUME NUMBER | GROUP NUMBER | COPY COMPLETED ADDRESS |
|---|---|---|---|---|---|---|---|
| 1 | NORMAL | C | 1 | A | 1 | 1 | 0 |
| 2 | NORMAL | C | 2 | A | 2 | 1 | 0 |
| 3 | NORMAL | C | 1 | B | 1 | 1 | 0 |
| 4 | NORMAL | C | 2 | B | 2 | 1 | 0 |

FIG. 44

| GROUP NUMBER | GROUP STATE | PAIR SET | JOURNAL LOGICAL VOLUME NUMBER | UPDATE NUMBER | REPLICATION TYPE | PARTNER STORAGE SYSTEM NUMBER | PARTNER GROUP NUMBER |
|---|---|---|---|---|---|---|---|
| 1 | NORMAL | 1,2 | 0 | 5 | SYNC | A | 2 |
| 2 | NORMAL | 3,4 | 3 | 5 | ASYNC | B | 1 |

FIG. 45

| LOGICAL VOLUME NUMBER | VOLUME STATE | FORMAT | CAPACITY | SYNC PAIR NUMBER | ASYNC PAIR NUMBER | PHYSICAL ADDRESS | |
|---|---|---|---|---|---|---|---|
| | | | | | | STORAGE DEVICE NUMBER | POSITION FROM THE HEAD |
| 1 | SECONDARY | OPEN3 | 3 | 3 | 0 | 1 | 0 |
| 2 | SECONDARY | OPEN6 | 6 | 4 | 0 | 1 | 3 |
| 3 | BLANK | OPEN6 | 6 | 0 | 0 | 1 | 9 |
| 4 | NORMAL | OPEN9 | 9 | 0 | 0 | 2 | 0 |
| 5 | NORMAL | OPEN3 | 3 | 0 | 0 | 2 | 9 |
| 6 | BLANK | OPEN6 | 6 | 0 | 0 | 2 | 12 |

FIG. 46

| PAIR NUMBER | PAIR STATE | PRIMARY STORAGE SYSTEM NUMBER | PRIMARY LOGICAL VOLUME NUMBER | SECONDARY STORAGE SYSTEM NUMBER | SECONDARY LOGICAL VOLUME NUMBER | GROUP NUMBER | COPY COMPLETED ADDRESS |
|---|---|---|---|---|---|---|---|
| 1 | BLANK | A | 1 | B | 1 | 1 | 0 |
| 2 | BLANK | A | 2 | B | 2 | 1 | 0 |
| 3 | NORMAL | C | 1 | A | 1 | 2 | 0 |
| 4 | NORMAL | C | 2 | A | 2 | 2 | 0 |
| 5 | BLANK | 0 | 0 | 0 | 0 | 0 | 0 |

FIG. 47

| GROUP NUMBER | GROUP STATE | PAIR SET | JOURNAL LOGICAL VOLUME NUMBER | UPDATE NUMBER | REPLICATION TYPE | PARTNER STORAGE SYSTEM NUMBER | PARTNER GROUP NUMBER |
|---|---|---|---|---|---|---|---|
| 1 | BLANK | 1,2 | 0 | 5 | ASYNC | B | 1 |
| 2 | NORMAL | 3,4 | 4 | 5 | SYNC | C | 1 |

DATA PROCESSING METHOD PROVIDING REMOTE COPY IN A SYSTEM HAVING FIRST, SECOND, AND THIRD STORAGE SYSTEMS

CROSS-REFERENCE TO RELATED APPLICATIONS

The present application is a continuation application of application Ser. No. 11/334,511, filed Jan. 19, 2006 now U.S. Pat. No. 7,143,254, which is a divisional application of application Ser. No. 10/784,356, filed Feb. 23, 2004 now U.S. Pat. No. 7,130,975, and claim the benefit of foreign priority of Japanese Application No. 2003-316183, filed Sep. 9, 2003, the contents of which are incorporated herein by reference.

BACKGROUND OF THE INVENTION

The present invention relates to storage systems, and more particularly, to data replication among a plurality of storage systems and resuming data replication processing when failures occur in the storage systems.

RELATED BACKGROUND ART

In recent years, in order to provide continuous service to clients at all times, technologies concerning data replication among storage systems have become important to make it possible for a data processing system to provide services even when a failure occurs in a first storage system. There have been technologies for replicating information stored in the first storage system on second and third storage systems.

For example, according to one of the known technologies, a first storage system stores data in a first storage system, and transfers data stored in the first storage system to a second storage system, as well as to a third storage system. A computer and the first storage system are connected by a communications link, the first storage system and the second storage system are connected by a communications link, and the first storage system and the third storage system are also connected by a communications link. The first storage system has a first logical volume that is the subject of replication. The second storage system has a second logical volume that is a replication of the first logical volume. The third storage system has a third logical volume that is a replication of the first logical volume. The first storage system, when updating the first logical volume, performs a data replication processing on the second logical volume, and stores in management information a difference between the first logical volume data and the third logical volume data for every data size of a predetermined size. Subsequently, the first storage system uses the management information to perform a data replication processing on the third logical volume.

The conventional technology described manages the difference in data between the first logical volume and the third logical volume for every data size of a predetermined size. The management information that manages such differences entails a problem of growing larger in proportion to the amount of data that is the subject of replication. Furthermore, due to the fact that the third logical volume is updated based on the management information and in an order unrelated to the order of data update, data integrity cannot be maintained in the third logical volume.

SUMMARY OF THE INVENTION

The present invention relates to a data processing system that performs a data replication processing from a first storage system to a third storage system, while maintaining data integrity in the third storage system. Furthermore, the present invention relates to reducing the amount of management information used in data replication.

The present invention also relates to a data processing system that maintains data integrity in the third storage system even while data in the third storage system is updated to the latest data in the event the first storage system fails. Moreover, a data processing system in accordance with the present invention shortens the amount of time required to update data to the latest data.

In accordance with an embodiment of the present invention, a first storage system stores as journal information concerning update of data stored in the first storage system. Each journal is formed from a copy of data used for update, and update information such as a write command for update, an update number that indicates a data update order, etc. Furthermore, a third storage system obtains the journal via a communications line between the first storage system and the third storage system and stores the journal in a storage area dedicated to journals. The third storage system has a replication of data that the first storage system has, and uses the journal to update data that corresponds to data in the first storage system in the order of the data update in the first storage system.

Furthermore, a second storage system has a replication of data that the first storage system has, and the first storage system updates data stored in the second storage system via a communications line between the second storage system and the first storage system when data stored in the first storage system is updated. A data update command on this occasion includes an update number or an update time that was used when the first storage system created the journal. When the data is updated, the second storage system creates update information using the update number or the update time it received from the first storage system and stores the update information as a journal in a storage area dedicated to journals.

In the event the first storage system fails, the third storage system obtains via a communications line between the second storage system and the third storage system only those journals that the third storage system does not have and updates data that correspond to data in the first storage system in the order of data update in the first storage system.

According to the present invention, the amount of management information required for data replication can be reduced while maintaining data integrity among a plurality of storage systems. Furthermore, according to the present invention, in the event a storage system or a host computer that comprises a data processing system fails, data replication can be continued at high speed and efficiently while maintaining data integrity.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Preferred embodiments of the present invention will now be described in conjunction with the accompanying drawings, in which:

FIG. 3 is a diagram illustrating the relationship between update information and write data according to one embodiment of the present invention.

FIG. 4 is a diagram illustrating an example of volume information according to one embodiment of the present invention.

FIG. 5 is a diagram illustrating an example of pair information according to one embodiment of the present invention.

FIG. 6 is a diagram illustrating an example of group information according to one embodiment of the present invention.

FIG. 7 is a diagram illustrating an example of pointer information according to one embodiment of the present invention.

FIG. 21 is a diagram illustrating an example of update information according to one embodiment of the present invention.

FIG. 22 is a diagram illustrating an example of update information when a journal creation processing takes place according to one embodiment of the present invention.

FIG. 26 is a diagram illustrating an example of volume information according to one embodiment of the present invention.

FIG. 27 is a diagram illustrating an example of pair information according to one embodiment of the present invention.

FIG. 28 is a diagram illustrating an example of group information according to one embodiment of the present invention.

FIG. 29 is a diagram illustrating an example of pointer information according to one embodiment of the present invention.

FIG. 31 is a diagram illustrating an example of volume information according to one embodiment of the present invention.

FIG. 32 is a diagram illustrating an example of pair information according to one embodiment of the present invention.

FIG. 33 is a diagram illustrating an example of group information according to one embodiment of the present invention.

FIG. 34 is a diagram illustrating an example of pointer information according to one embodiment of the present invention.

FIG. 36 is a diagram illustrating an example of pair information according to one embodiment of the present invention.

FIG. 37 is a diagram illustrating an example of group information according to one embodiment of the present invention.

FIG. 38 is a diagram illustrating an example of volume information according to one embodiment of the present invention.

FIG. 39 is a diagram illustrating an example of pair information according to one embodiment of the present invention.

FIG. 40 is a diagram illustrating an example of group information according to one embodiment of the present invention.

FIG. 41 is a diagram illustrating an example of pointer information according to one embodiment of the present invention.

FIG. 43 is a diagram illustrating an example of pair information according to one embodiment of the present invention.

FIG. 44 is a diagram illustrating an example of group information according to one embodiment of the present invention.

FIG. 45 is a diagram illustrating an example of volume information according to one embodiment of the present invention.

FIG. 46 is a diagram illustrating an example of pair information according to one embodiment of the present invention.

FIG. 47 is a diagram illustrating an example of group information according to one embodiment of the present invention.

DESCRIPTION OF THE PREFERRED EMBODIMENTS

A data processing system in accordance with an embodiment of the present invention will now be described with reference to the accompanying drawings.

Figure 1:
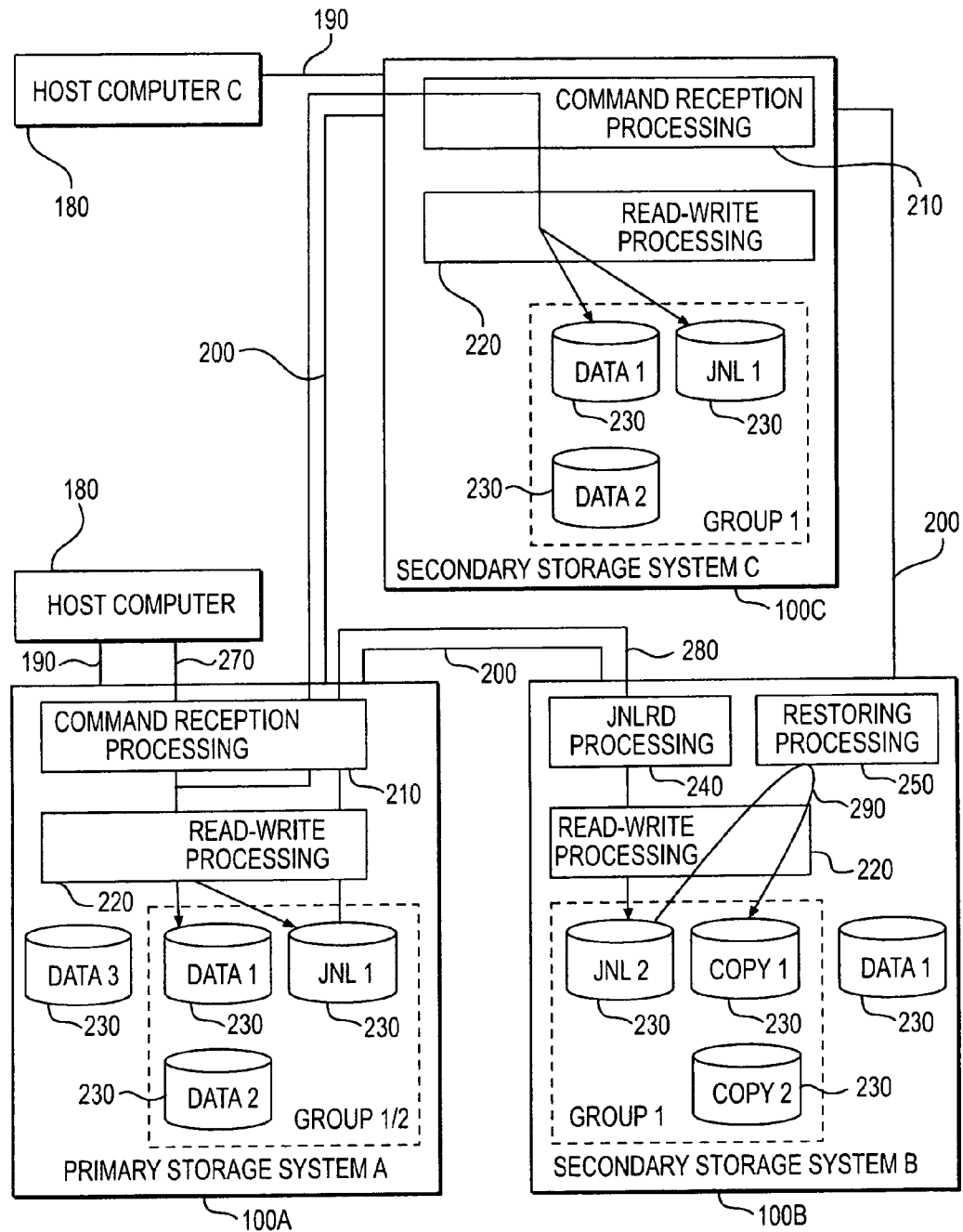
FIG. 1 is a block diagram of a logical configuration of one embodiment of the present invention.

FIG. 1 is a block diagram of a logical configuration of one embodiment of the present invention.

According to the present embodiment, a host computer 180 and a storage system 100A are connected by a connection path 190, and the storage system 100A is connected to a storage system 100B and a storage system 100C, which have replications of data stored in the storage system 100A, by connection paths 200. Furthermore, the storage system 100B and the storage system 100C are connected by the connection path 200. In the following description, in order to readily differentiate the storage system 100 having data that is the subject of replication and the storage systems 100 that have replicated data, the storage system 100 having the data that is the subject of replication shall be called a primary storage system 100A, while storage systems 100 that have the replicated data shall be called a secondary storage system 100B and a secondary storage system 100C. Storage areas within each storage system are managed in divided areas, and each divided storage area is called a logical volume.

The capacity and the physical storage position (a physical address) of each logical volume 230 within each storage system 100 can be designated using a maintenance terminal, such as a computer, or the host computer 180 connected to the storage system 100. The physical address of each logical volume 230 is stored in volume information 400, described later. A physical address is, for example, a number (a storage device number) that identifies a storage device 150 (see FIG. 2) within the storage system 100 and a numerical value that uniquely identifies a storage area within the storage device 150, such as a position from the head of a storage area in the storage device 150. In the following description, a physical address shall be a combination of a storage device number and a position from the head of a storage area within a storage device. Although a logical volume is a storage area of one storage device in the following description, one logical volume can be correlated to storage areas of a plurality of storage devices by converting logical addresses and physical addresses.

Data stored in each storage system 100 can be uniquely designated for referencing and updating purposes by using a number (a logical volume number) that identifies a logical volume and a numerical value that uniquely identifies a storage area, such as a position from the head of a storage area of a logical volume; a combination of a logical volume number and a position from the head of a storage area in the logical volume (a position within logical address) shall hereinafter be called a logical address.

In the following description, in order to readily differentiate data that is the subject of replication from replicated data, the logical volume 230 with data that is the subject of replication shall be called a primary logical volume, while the logical volumes 230 with replicated data shall be called secondary logical volumes. A primary logical volume and a corresponding secondary logical volume shall be called a pair. The state and relationship between a primary logical volume and a secondary logical volume are stored in pair information 500, described later.

A management unit called a group is provided in order to maintain the order of data update between logical volumes. For example, let us assume that the host computer 180 updates data 1 in a primary logical volume 1, and subsequently reads data 1 and uses numerical values of the data 1 to perform a processing to update data 2 in a primary logical volume 2. When a data replication processing from the primary logical volume 1 to a secondary logical volume 1, and a data replication processing from the primary logical volume 2 to a secondary logical volume 2, take place independently, the replication processing of data 2 to the secondary logical volume 2 may take place before the replication processing of data 1 to the secondary logical volume 1. If the replication processing of data 1 to the secondary logical volume 1 is halted due to a failure that occurs between the replication processing of data 2 to the secondary logical volume 2 and the replication processing of data 1 to the secondary logical volume 1, the data integrity between the secondary logical volume 1 and the secondary logical volume 2 is lost. In order to maintain data integrity between the secondary logical volume 1 and the secondary logical volume 2 even in such instances, logical volumes whose data update order must be maintained are registered in the same group, so that an update number from group information 600, described later, is allocated to each logical volume within one group, and a replication processing to the secondary logical volumes is performed in the order of update numbers. Update times may be used in place of update numbers. For example, in FIG. 1, a logical volume (DATA 1) and a logical volume (DATA 2) form a group 1 in the primary storage system 100A. Furthermore, a logical volume (data 1), which is a replication of the logical volume (DATA 1), and a logical volume (data 2), which is a replication of the logical volume (DATA 2), form a group 1 in the secondary storage system 100C. Similarly, a logical volume (COPY 1), which is a replication of the logical volume (DATA 1), and a logical volume (COPY 2), which is a replication of the logical volume (DATA 2), form a group 1 in the secondary storage system 100B.

When updating data of the primary logical volumes (DATA 1, DATA 2) that are the subject of replication, the primary storage system 100A creates journals, described later, and stores them in a logical volume of the primary storage system 100A in order to update data of the secondary logical volumes (COPY 1, COPY 2). In the description of the present embodiment example, a logical volume that stores journals only (hereinafter called a "journal logical volume") is allocated to each group. In FIG. 1, the journal logical volume for group 1 is a logical volume (JNL 1).

Similarly, when updating data in the secondary logical volumes (data 1, data 2) of the secondary storage system 100C, the secondary storage system 100C creates journals, described later, and stores them in a journal logical volume within the secondary storage system 100C. In FIG. 1, the journal logical volume for group 1 is a logical volume (jnl 1).

A journal logical volume is allocated to each group within the secondary storage system 100B as well. Each journal logical volume is used to store journals that are transferred from the primary storage system 100A to the secondary storage system 100B. When there is a high load on the secondary storage system 100B, instead of updating data of the secondary logical volumes (COPY 1, COPY 2) when the journals are received, the data of the secondary logical volumes (COPY 1, COPY 2) can be updated later when the load on the secondary storage system 100B is low, for example, by storing journals in the journal logical volume. Furthermore, if there is a plurality of connection paths 200, the transfer of journals from the primary storage system 100A to the secondary storage system 100B can be performed in a multiplex manner to make effective use of the transfer capability of the connection paths 200. Numerous journals may accumulate in the secondary storage system 100B due to update order, but this does not pose any problem since journals that cannot be used immediately for data updating of the secondary logical volumes can be stored in the journal logical volume. In FIG. 1, the journal logical volume for group 1 is a logical volume (JNL 2).

Each journal is comprised of write data and update information. The update information is information for managing write data, and comprises of the time at which a write command was received (update time), a group number, an update number in the group information 600 described later, a logical address of the write command, the size of the write data, and the logical address in the journal logical volume where the write data is stored. The update information may have only either the time at which the write command was received or the update number. If the time at which the write command was created is in the write command from the host computer 180, the time at which the write command was created can be used instead of the time at which the write command was received. Using FIGS. 3 and 21, an example of update information of a journal will be described. Update information 310 stores a write command that was received at 22:20:10 on Mar. 17, 1999. The write command is a command to store write data at position 700 from the head of a storage area of a logical volume number 1, and the data size is 300. The write data in the journal is stored beginning at position 1500 from the head of a storage area in a logical volume number 4 (the journal logical volume). From this, it can be seen that the logical volume whose logical volume number is 1 belongs to group 1 and that this is the fourth data update since data replication of group 1 began.

As shown in FIG. 3, each journal logical volume is divided into a storage area for storing update information (an update information area) and a storage area for storing write data (a write data area), for example. In the update information area, update information is stored from the head of the update information area in the order of update numbers; when the update information reaches the end of the update information area, the update information is stored from the head of the update information area again. In the write data area, write data are stored from the head of the write data area; when the write data reach the end of the write data area, the write data are stored from the head of the write data area again. The ratio of the update information area to the write data area can be a fixed value or set through a maintenance terminal or the host computer 180. Such information is stored in pointer information 700, described later. In the following description, each journal logical volume is divided into areas for update information and write data; however, a method in which journals, i.e., update information and corresponding write data, are consecutively stored from the head of a logical volume can also be used.

Referring to FIG. 1, an operation for reflecting data update made to the primary logical volume (DATA 1) of the primary storage system 100A on the secondary logical volume (data 1) of the secondary storage system 100C and the secondary logical volume (COPY 1) of the secondary storage system 100B will be generally described.

(1) Upon receiving a write command for data in the primary logical volume (DATA 1) from the host computer 180, the primary storage system 100A updates data in the primary logical volume (DATA 1), stores journals in the journal logical volume (JNL 1), and issues a command to the secondary system 100C to update the corresponding data in the secondary logical volume (data 1) in the secondary system 100C (a remote write command), through a command reception processing 210 and a read/write processing 220 described later (270 in FIG. 1).

(2) Upon receiving the remote write command from the primary storage system 100A, the secondary storage system 100C updates corresponding data in the secondary logical volume (data 1) and stores the journals in the journal logical volume (jnl 1) through the command reception processing 210 and the read/write processing 220, described later (270 in FIG. 1).

(3) After receiving a response to the remote write command, the primary storage system 100A reports the end of the write command to the host computer 180. As a result, data in the primary logical volume (DATA 1) in the primary storage system 100A and data in the secondary logical volume (data 1) in the secondary storage system 100C match completely. Such data replication is called synchronous data replication.

(4) The secondary storage system 100B reads the journals from the primary storage system 100A through a journal read processing 240, described later, and stores the journals in the journal logical volume (JNL 2) through the read/write processing 220 (280 in FIG. 1).

(5) Upon receiving a journal read command from the secondary storage system 100B, the primary storage system 100A reads the journals from the journal logical volume (JNL 1) and sends the journals to the secondary storage system 100B through the command reception processing 210 and the read/write processing 220, described later (280 in FIG. 1).

(6) The secondary storage system 100B uses the pointer information 700 through a restore processing 250 and the read/write processing 220, described later, to read the journals from the journal logical volume (JNL 2) in ascending order of update numbers and updates data in the secondary logical volume (COPY 1) (290 in FIG. 1). As a result, data in the primary logical volume (DATA 1) in the primary storage system 100A and data in the secondary logical volume (COPY 1) in the secondary storage system 100B match completely some time after the update of the primary logical volume (DATA 1). Such data replication is called asynchronous data replication.

Figure 2:
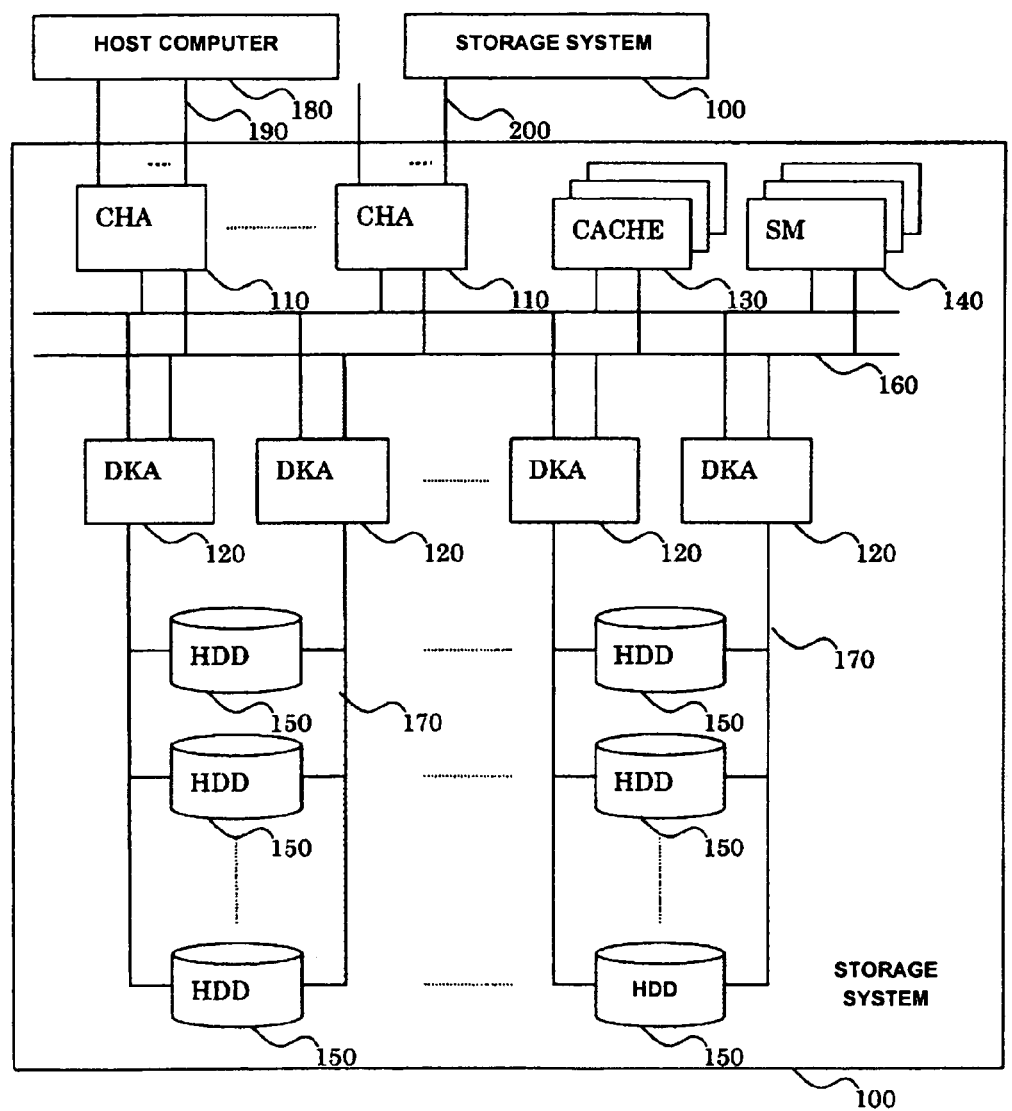
FIG. 2 is a block diagram of a storage system in accordance with one embodiment of the present invention.

The internal configuration of the storage system 100 is shown in FIG. 2. Each storage system 100 is comprised of one or more host adapters 110, one or more disk adapters 120, one or more cache memories 130, one or more shared memories 140, one or more storage devices 150, one or more common paths 160, and one or more connection lines 170. The host adapters 110, the disk adapters 120, the cache memories 130 and the shared memories 140 are mutually connected by the common paths 160. The common paths 160 may be redundant in case of a failure of one of the common paths 160. The disk adapters 120 and the storage devices 150 are connected by the connection lines 170. In addition, although not shown, a maintenance terminal for setting, monitoring and maintaining the storage system 100 is connected to every host adapter 110 and every disk adapter 120 by a dedicated line.

Each host adapter 110 controls data transfer between the host computer 180 and the cache memories 130. Each host adapter 110 is connected to the host computer 180 or another storage system 100 via a connection line 190 and the connection path 200, respectively. Each disk adapter 120 controls data transfer between the cache memories 130 and the storage devices 150. The cache memories 130 are memories for temporarily storing data received from the host computer 180 or data read from the storage devices 150. The shared memories 140 are memories shared by all host adapters 110 and disk adapters 120 within the same storage system 100.

The volume information 400 is information for managing logical volumes and includes volume state, format, capacity, synchronous pair number, asynchronous pair number, and physical address. FIG. 4 shows an example of the volume information 400. The volume information 400 is stored in a memory, such as the shared memories 140, that can be referred to by the host adapters 110 and the disk adapters 120. The volume state is one of "normal," "primary," "secondary," "abnormal," and "blank." The logical volume 230 whose volume state is "normal" or "primary" indicates that the logical volume 230 can be accessed normally from the host computer 180. The logical volume 230 whose volume state is "secondary" can allow access from the host computer 180. The logical volume 230 whose volume state is "primary" indicates that it is the logical volume 230 from which data is being replicated. The logical volume 230 whose volume state is "secondary" indicates that it is the logical volume 230 on which replication is made. The logical volume 230 whose volume state is "abnormal" indicates that it is the logical volume 230 that cannot be accessed normally due to a failure. A failure may be a malfunction of the storage device 150 that has the logical volume 230, for example. The logical volume 230 whose volume state is "blank" indicates that it is not in use. Synchronous pair numbers and asynchronous pair numbers are valid if the corresponding volume state is "primary" or "secondary," and each stores a pair number for specifying the pair information 500, described later. If there is no pair number to be stored, an invalid value (for example, "0") is set. In the example shown in FIG. 4, a logical volume 1 has OPEN 3 as format, a capacity of 3 GB, its data stored from the head of a storage area of the storage device 150 whose storage device number is 1, is accessible, and is a subject of data replication.

The pair information 500 is information for managing pairs and includes a pair state, a primary storage system number, a primary logical volume number, a secondary storage system number, a secondary logical volume number, a group number, and a copy complete address (i.e., copied address). FIG. 5 shows an example of the pair information 500. The pair information 500 is stored in a memory, such as the shared memories 140, that can be referred to by the host adapters 110 and the disk adapters 120. The pair state is one of "normal," "abnormal," "blank," "not copied" and "copying." If the pair state is "normal," it indicates that data of the primary logical volume 230 is replicated normally. If the pair state is "abnormal," it indicates that data in the primary logical volume 230 cannot be replicated due to a failure. A failure can be a disconnection of the connection path 200, for example. If the pair state is "blank," it indicates that the corresponding pair number information is invalid. If the pair state is "copying," it indicates that an initial copy processing, described later, is in progress. If the pair state is "not copied," it indicates that the initial copy processing, described later, has not yet taken place. The primary storage system number is a number that specifies the primary storage system 100A that has the primary logical volume 230. The secondary storage system number is a number that specifies the secondary storage system 100B that has the secondary logical volume 230. The group number is a group number to which the primary logical volume belongs to, if the storage system is the primary storage system. The group number is a group number to which the secondary logical volume belongs to, if the storage system is a secondary storage system. The copy complete address will be described when the initial copy processing is described later. Pair information 1 in FIG. 5 indicates that the subject of data replication is the primary logical volume 1 in the primary storage system A, that the data replication destination is the secondary logical volume 1 in the secondary storage system B, and that the data replication processing has taken place.

The group information 600 includes a group state, a pair set, a journal logical volume number, an update number, a replication type, a partner storage system number, and a partner group number. FIG. 6 shows an example of the group information 600. The group information 600 is stored in a memory, such as the shared memories 140, that can be referred to by the host adapters 110 and the disk adapters 120. The group state is one of "normal," "abnormal," "blank," "halted," and "in preparation." If the group state is "normal," it indicates that at least one pair state in the corresponding pair sets is in the "normal" state. If the group state is "abnormal," it indicates that all pair states in the corresponding pair sets are in the "abnormal" state. If the group state is "blank," it indicates that corresponding group number information is invalid. If the storage system is the primary storage system, the "halted" group state indicates that journals will not be created temporarily. The state is used when the group state is "normal" and journal creation is to be halted temporarily. If the storage system is a secondary storage system, the "halted" group state indicates that the journal read processing will not be carried out temporarily. The state is used when the group state is "normal" and reading journals from the primary storage system is to be temporarily halted. If the group state is "in preparation," it indicates that a data replication initiation processing, described later, is in progress. If the storage system is the primary storage system, each pair set includes pair numbers of all primary logical volumes that belong to the group indicated by the corresponding group number. If the storage system is a secondary storage system, each pair set includes pair numbers of all secondary logical volumes that belong to the group indicated by the corresponding group number. The journal logical volume number indicates the journal logical volume number that belongs to the group with the corresponding group number. If there is no journal logical volume that belongs to the group with the corresponding group number, an invalid value (for example, "0") is set. The update number has an initial value of 1 and changes whenever a journal is created. The update number is stored in the update information of journals and used by the secondary storage system 100B to maintain the order of data update. The replication type is either "synchronous" or "asynchronous." If the replication type is "synchronous," the primary logical volume and the secondary logical volume are updated simultaneously. As a result, data in the primary logical volume and data in the secondary logical volume match completely. If the replication type is "asynchronous," the secondary logical volume is updated after the primary logical volume is updated. As a result, data in the primary logical volume and data in the secondary logical volume sometimes do not match (i.e., data in the secondary logical volume is old data of the primary logical volume), but data in the secondary logical volume completely matches data in the primary logical volume after some time. If the storage system is the primary storage system, the partner storage system number is the secondary storage system number that has the paired secondary logical volume that belongs to the corresponding group. If the storage system is a secondary storage system, the partner storage system number is the primary storage system number that has the paired primary logical volume that belongs to the corresponding group. If the storage system is the primary storage system, the partner group number is the group number to which the paired secondary logical volume of the corresponding group belongs. If the storage system is a secondary storage system, the partner group number is the group number to which the paired primary logical volume of the corresponding group belongs. For example, group information 1 in FIG. 6 is comprised of primary logical volumes 1, 2 based on pair information 1, 2, and of a journal logical volume 4, and indicates that data replication processing (asynchronous) has taken place normally.

Figure 8:
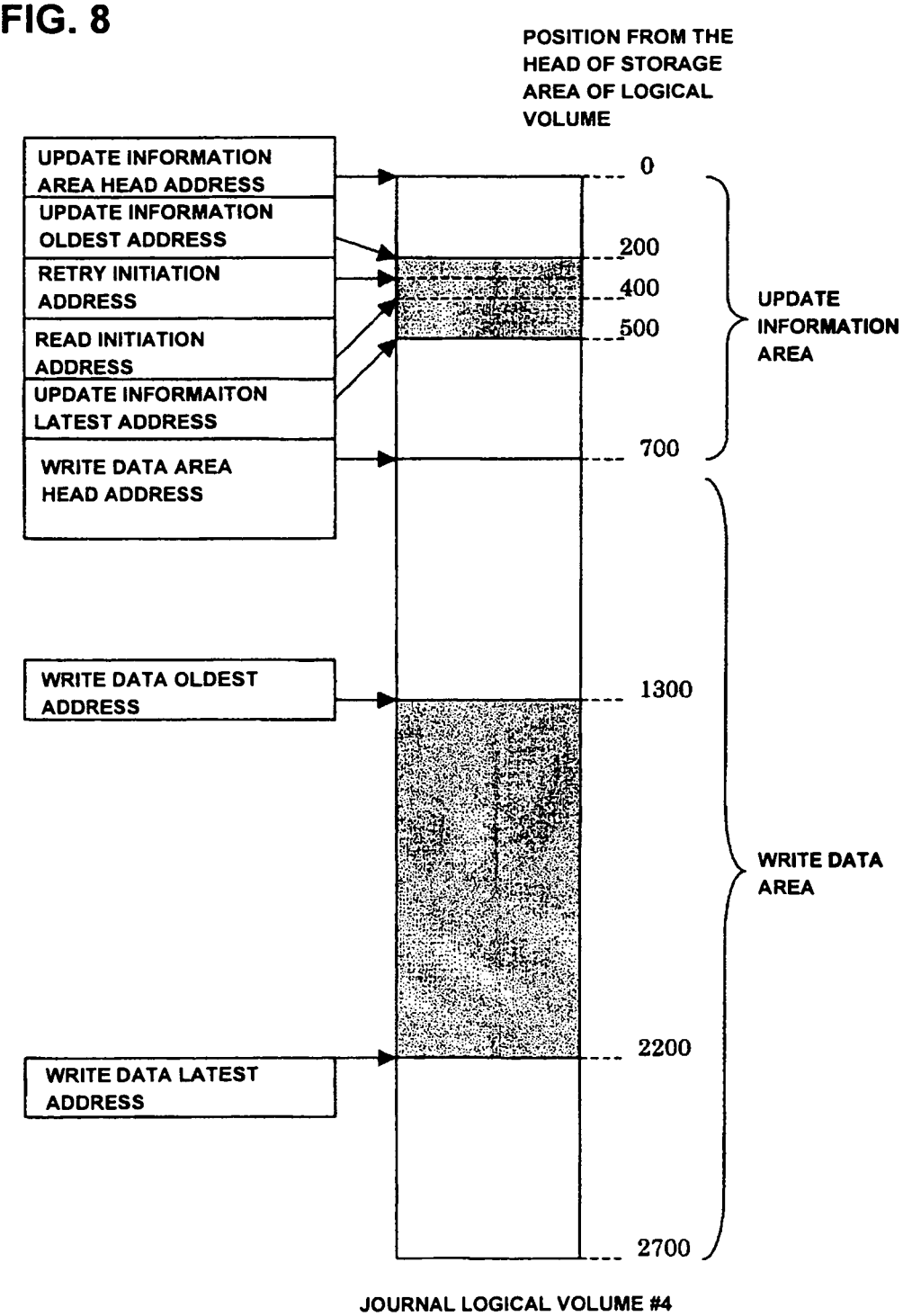
FIG. 8 is a diagram illustrating the structure of a journal logical volume according to one embodiment of the present invention.

The pointer information 700 is stored for each group and is information for managing the journal logical volume for the corresponding group; it includes an update information area head address, a write data area head address, an update information latest address, an update information oldest address, a write data latest address, a write data oldest address, a read initiation address, and a retry initiation address. FIGS. 7 and 8 show an example of the pointer information 700. The update information area head address is the logical address at the head of the storage area for storing update information in the journal logical volume (update information area). The write data area head address is the logical address at the head of the storage area for storing write data in the journal logical volume (write data area). The update information latest address is the head logical address to be used for storing update information when a journal is stored next. The update information oldest address is the head logical address that stores update information of the oldest (i.e., having the lowest update number) journal. The write data latest address is the head logical address to be used for storing write data when a journal is stored next. The write data oldest address is the head logical address that stores write data of the oldest (i.e., the having the lowest update number) journal. The read initiation address and the retry initiation address are used only in the primary storage system 100A in the journal read reception processing, described later. In the example of the pointer information 700 shown in FIGS. 7 and 8, the area for storing journal update information (the update information area) spans from the head of the storage areas to position 699 of the logical volume 4, while the area for storing journal write data (the write data area) spans from position 700 to position 2699 of the storage areas of the logical volume 4. The journal update information is stored from position 200 to position 499 of the storage areas of the logical volume 4, and the next journal update information will be stored beginning at position 500 of the storage areas of the logical volume 4. The journal write data is stored from position 1300 to position 2199 of the storage areas of the logical volume 4, and the next journal write data will be stored beginning at position. 2200 of the storage areas of the logical volume 4.

Although a mode in which one journal logical volume is allocated to each group is described below, a plurality of journal logical volumes may be allocated to each group. For example, two journal logical volumes can be allocated to one group, and the pointer information 700 can be provided for each journal logical volume, so that journals can be stored in the two journal logical volumes alternately. By doing this, writing the journals to the storage device 150 can be distributed, which can improve performance. Furthermore, this can also improve the journal read performance. Another example would be one in which two journal logical volumes are allocated to one group, but only one journal logical volume is normally used. The other journal logical volume is used when the performance of the journal logical volume that is normally used declines or the journal logical volume that is normally used fails and cannot be used. An example of the declining performance of the logical volume that is normally used is a case in which a journal logical volume is comprised of a plurality of storage devices 150, where data are stored in RAID method, and at least one storage device 150 that comprises the RAID fails.

It is preferable for the volume information 400, the pair information 500, the group information 600 and the pointer information 700 to be stored in the shared memories 140. However, the present embodiment example is not limited to this and the information can be stored together or dispersed among the cache memories 130, the host adapters 110, the disk adapters 120, and/or storage devices 150.

Figure 9:
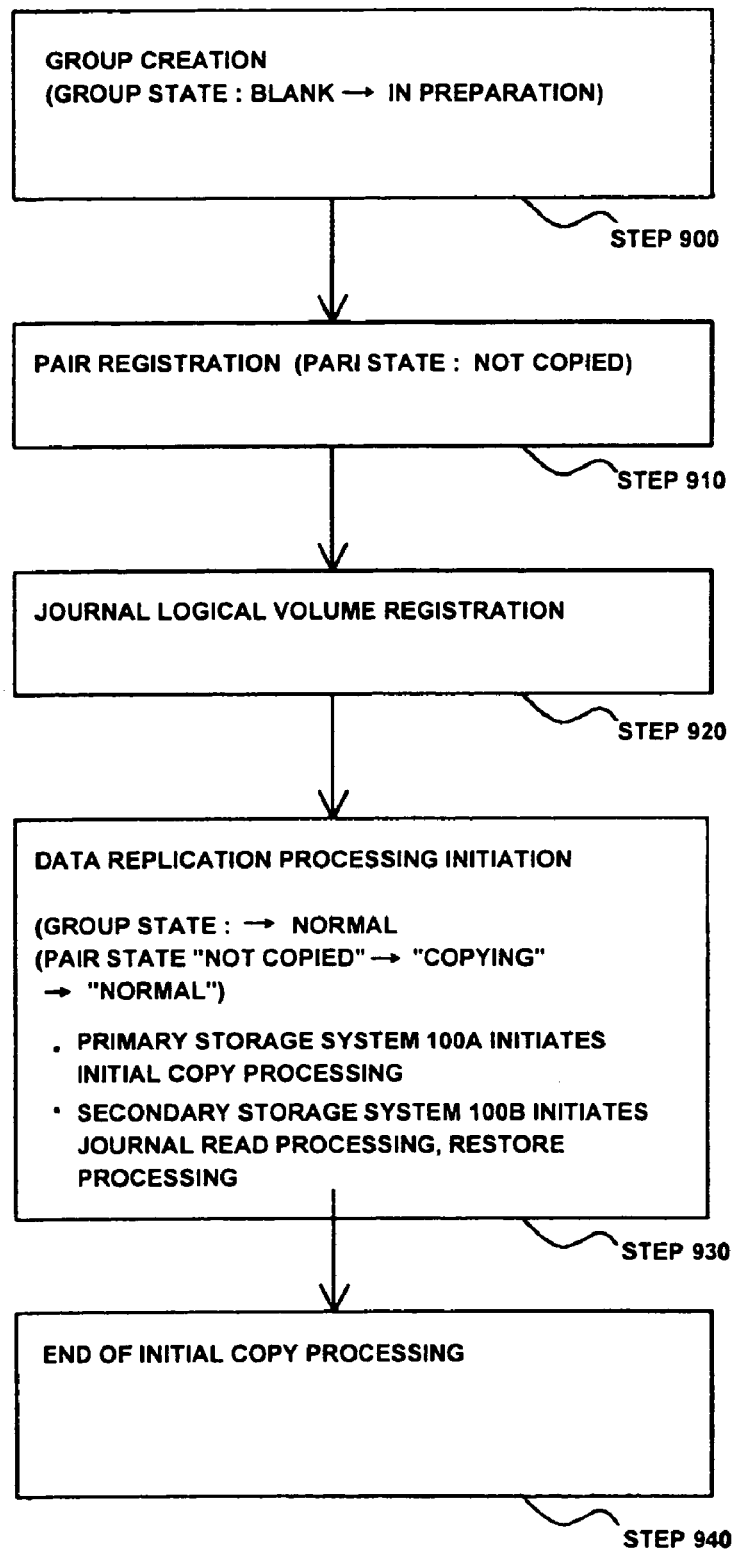
FIG. 9 is a flowchart illustrating the procedure for initiating data replication according to one embodiment of the present invention.

Next, a procedure for initiating data replication (a data replication initiation processing) from the primary storage system 100A to the secondary storage system 100B and the secondary storage system 100C will be described using FIGS. 9 and 10.

(1) Group creation (step 900) will be described. Using a maintenance terminal or the host computer 180, a user refers to the group information 600 for the primary storage system 100A and obtains a group number A, whose group state is "blank." Similarly, the user obtains a group number B of the secondary storage system 100B (or of the secondary storage system 100C). Using the maintenance terminal or the host computer 180, the user gives a group creation instruction to the primary storage system 100A. The group creation instruction is comprised of the group number A that is the subject of the instruction, a partner storage system number B, a partner group number B, and a replication type.

Upon receiving the group creation instruction, the primary storage system 100A makes changes to the group information 600. Specifically, the primary storage system 100A sets the group state for the group number A that is the subject of instruction to "in preparation" in the group information 600; the partner storage system number to the partner storage system number B instructed; the partner group number to the partner group number B instructed; and the replication type to the replication type instructed. The primary storage system 100A sets the update number of the group information 600 to 1 (initial value). Furthermore, the primary storage system 100A gives a group creation instruction to the storage system having the partner storage system number B. In the group creation instruction, the group number that is the subject of the instruction is the partner group number B, the partner storage system number is the storage system number of the primary storage system 100A, the partner group number is the group number A that is the subject of the original instruction, and the replication type is the replication type instructed.

(2) Next, pair registration (step 910) will now be described. Using the maintenance terminal or the host computer 180, the user designates information that indicates the subject of data replication and information that indicates the data replication destination and gives a pair registration instruction to the primary storage system 100A. The information that indicates the subject of data replication is the group number A and the primary logical volume number A that are the subject of data replication. The information that indicates the data replication destination is the secondary logical volume number B in the secondary storage system 100B for storing the replication data.

Upon receiving the pair registration instruction, the primary storage system 100A obtains a pair number whose pair state is "blank" from the pair information 500 and sets "not copied" as the pair state; the primary storage system number A that indicates the primary storage system 100A as the primary storage system number; the primary logical volume number A instructed as the primary logical volume number; the partner storage system number of the group number A in the group information 600 as the secondary storage system number; the secondary logical volume number B instructed as the secondary logical volume number; and the group number A instructed as the group number. The primary storage system 100A adds the pair number obtained for the group number A instructed to the pair set in the group information 600, and changes the volume state of the primary logical volume number A to "primary."

The primary storage system 100A notifies the partner storage system for the group number A instructed in the group information 600 of the primary storage system number A indicating the primary storage system 100A, the partner group number B for the group number A in the group information 600, the primary logical volume number A, and the secondary logical volume number B, and commands a pair registration. The secondary storage system 100B obtains a blank pair number whose pair state is "blank" from the pair information 500 and sets "not copied" as the pair state; the primary storage system number A notified as the primary storage system number; the primary logical volume number A notified as the primary logical volume number; the secondary storage system number B as the secondary storage system number; the secondary logical volume number B notified as the secondary logical volume number; and the group number B notified as the group number. Additionally, the secondary storage system 100B adds the pair number obtained to the pair set for the group number B instructed in the group information 600, and changes the volume state of the secondary volume number B to "secondary."

The above operation is performed on all pairs that are the subject of data replication.

Although registering logical volumes with a group and setting logical volume pairs are performed simultaneously according to the processing, they can be done individually.

(3) Next, journal logical volume registration (step 920) will be described. Using the maintenance terminal or the host computer 180, the user gives the primary storage system 100A an instruction to register the logical volume to be used for storing journals (a journal logical volume) with a group (a journal logical volume registration instruction). The journal logical volume registration instruction is comprised of a group number and a logical volume number.

The primary storage system 100A registers the logical volume number instructed as the journal logical volume number for the group number instructed in the group information 600. In addition, the primary storage system 100A sets the volume state of the logical volume to "normal" in the volume information 400.

Similarly, using the maintenance terminal or the host computer 180, the user refers to the volume information 400 for the secondary storage system 100B, designates the secondary storage system 100B, the group number B, and the logical volume number to be used as the journal logical volume, and gives a journal logical volume registration instruction to the primary storage system 100A. The primary storage system 100A transfers the journal logical volume registration instruction to the secondary storage system 100B. The secondary storage system 100B registers the logical volume number instructed as the journal logical volume number for the group number B instructed in the group information 600. In addition, the secondary storage system 100B sets the volume state for the corresponding logical volume to "normal" in the volume information 400.

Alternatively, using the maintenance terminal of the secondary storage system 100B or the host computer 180 connected to the secondary storage system 100B, the user may designate the group number and the logical volume number to be used as the journal logical volume and give a journal logical volume registration instruction to the secondary storage system 100B. The user would then do the same with the secondary storage system 100C.

The operations described are performed on all logical volumes that are to be used as journal logical volumes. However, step 910 and step 920 may be reversed in order.

(4) Next, data replication processing initiation (step 930) will be described. Using the maintenance terminal or the host computer 180, the user designates a group number C, whose replication type is synchronous, and the group number B, whose replication type is asynchronous, for initiating the data replication processing, and instructs the primary storage system 100A to initiate the data replication processing. The primary storage system 100A sets all copy complete addresses in the pair information 500 that belong to the group B to 0.

The primary storage system 100A instructs the partner storage system 100B for the group number B in the group information 600 to change the group state of the partner group number of the group number B in the group information 600 to "normal" and to initiate the journal read processing and the restore processing, described later. The primary storage system 100A instructs the partner storage system 100C for the group number C in the group information 600 to change the group state of the partner group number of the group number C to "normal" in the group information 600.

The primary storage system 100A changes the group state of the group number C and of the group number B to "normal" and initiates the initial copy processing, described later.

Although the synchronous data replication processing initiation and the asynchronous data replication processing initiation are instructed simultaneously according to the description, they can be performed individually.

(5) Next, an initial copy processing end (step 940) will be described.

When the initial copying is completed, the primary storage system 100A notifies the end of the initial copy processing to the secondary storage system 100B and the secondary storage system 100C. The secondary storage system 100B and the secondary storage system 100C change the pair state of every secondary logical volume that belongs to either the group B or the group C to "normal."

Figure 10:
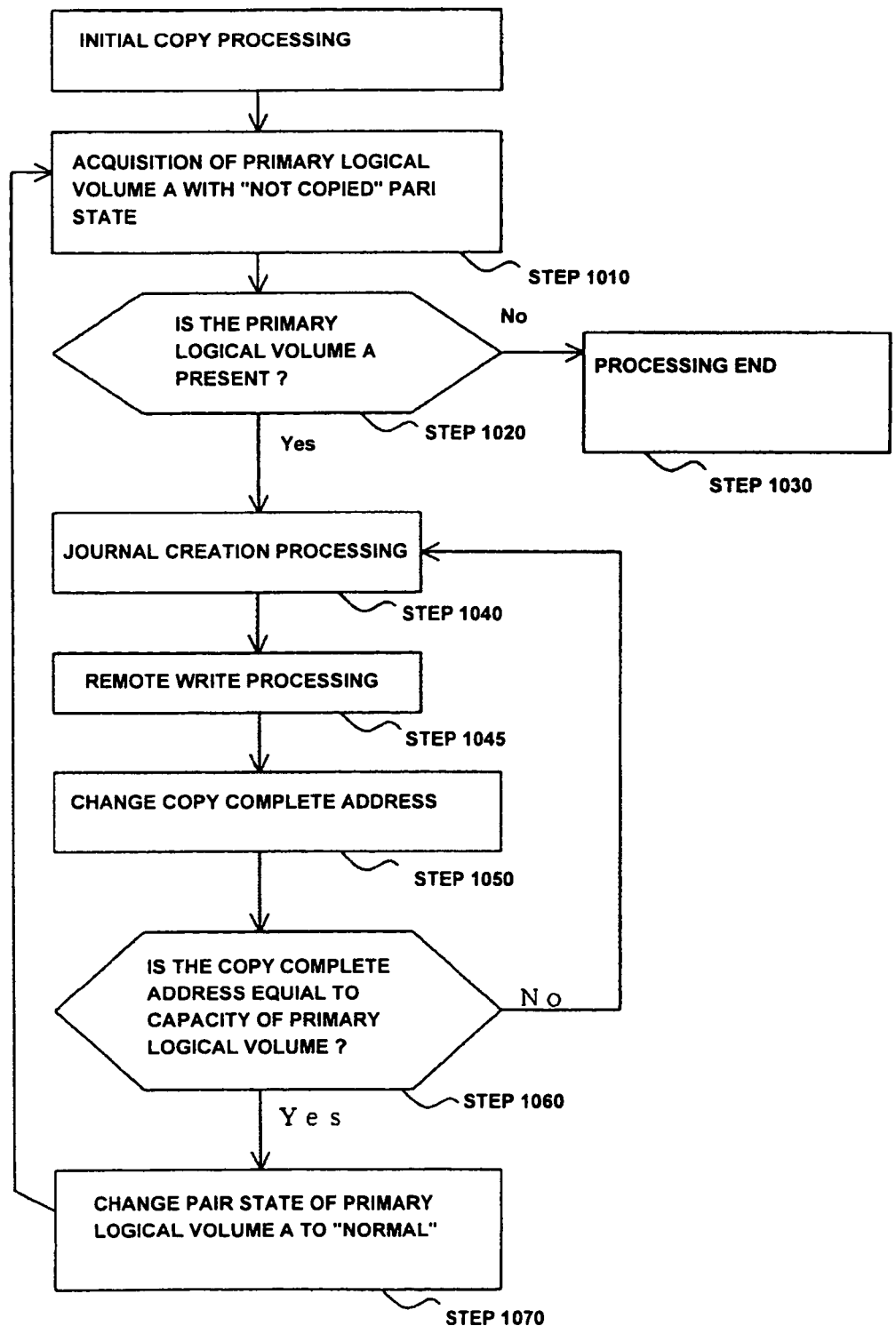
FIG. 10 is a flowchart illustrating an initial copy processing according to one embodiment of the present invention.

FIG. 10 is a flowchart of the initial copy processing. In the initial copy processing, using copy complete addresses in the pair information 500, a journal is created per unit size in sequence from the head of storage areas for all storage areas of the primary logical volume that is the subject of data replication. Copy complete addresses have an initial value of 0, and the amount of data created is added each time a journal is created. The storage areas from the head of the storage areas of each logical volume to one position prior to the copy complete addresses represent storage areas for which journals have been created through the initial copy processing. By performing the initial copy processing, data in the primary logical volume that have not been updated can be transferred to the secondary logical volume. A host adapter A within the primary storage system 100A performs the processing according to the following description, but the processing may be performed by the disk adapters 120.

(1) The host adapter A within the primary storage system 100A obtains a primary logical volume A that is part of a pair that belongs to the asynchronous replication type group B, which is the subject of processing, and whose pair state is "not copied"; the host adapter A changes the pair state to "copying" and repeats the following processing (steps 1010, 1020). If there is no primary logical volume A, the host adapter A terminates the processing (step 1030).

(2) If the primary logical volume A is found in step 1020 to exist, the host adapter A creates a journal per data unit size (for example, 1 MB data). The journal creation processing is described later (step 1040).

(3) To update data in the secondary logical volume that forms a synchronous pair with the primary logical volume A, the host adapter A sends a remote write command to the secondary storage system C, which has the secondary logical volume that is part of the synchronous pair. The remote write command includes a write command, a logical address (where the logical volume is the secondary logical volume C of the synchronous pair number, and the position within the logical volume is the copy complete address), data amount (unit size), and the update number used in step 1040. Instead of the update number, the time at which the journal was created may be used (step 1045). The operation of the secondary storage system C when it receives the remote write command will be described in a command reception processing 210, described later.

(4) Upon receiving a response to the remote write command, the host adapter A adds to the copy complete address the data size of the journal created (step 1050).

(5) The above processing is repeated until the copy complete addresses reach the capacity of the primary logical volume A (step 1060). When the copy complete addresses become equal to the capacity of the primary logical volume A, which indicates that journals have been created for all storage areas of the primary logical volume A, the host adapter A updates the pair state to "normal" and initiates the processing of another primary logical volume (step 1070).

Although logical volumes are described as the subject of copying one at a time according to the flowchart, a plurality of logical volumes can be processed simultaneously.

Figure 11:
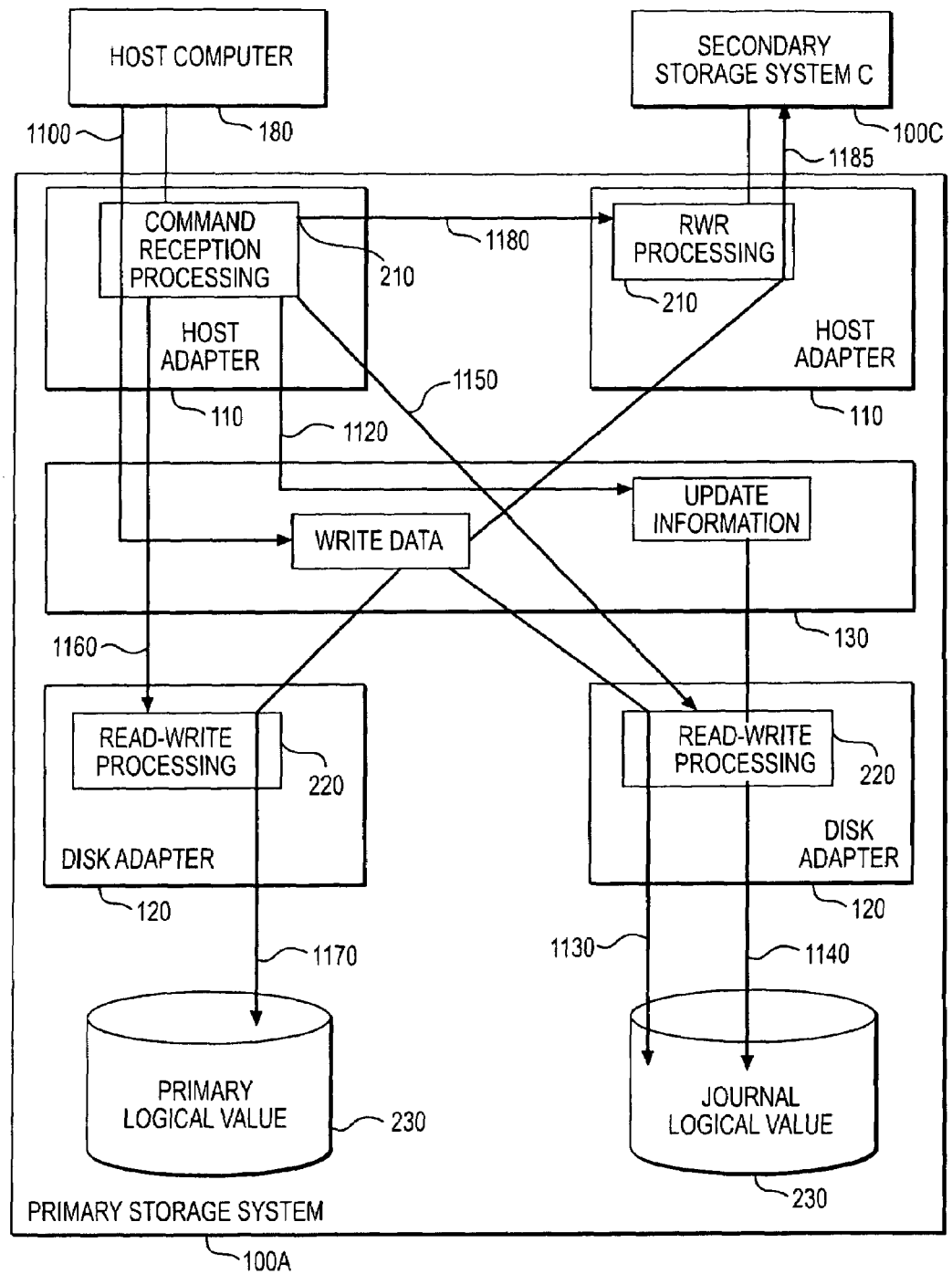
FIG. 11 is a diagram illustrating a command reception processing according to one embodiment of the present invention.
Figure 12:
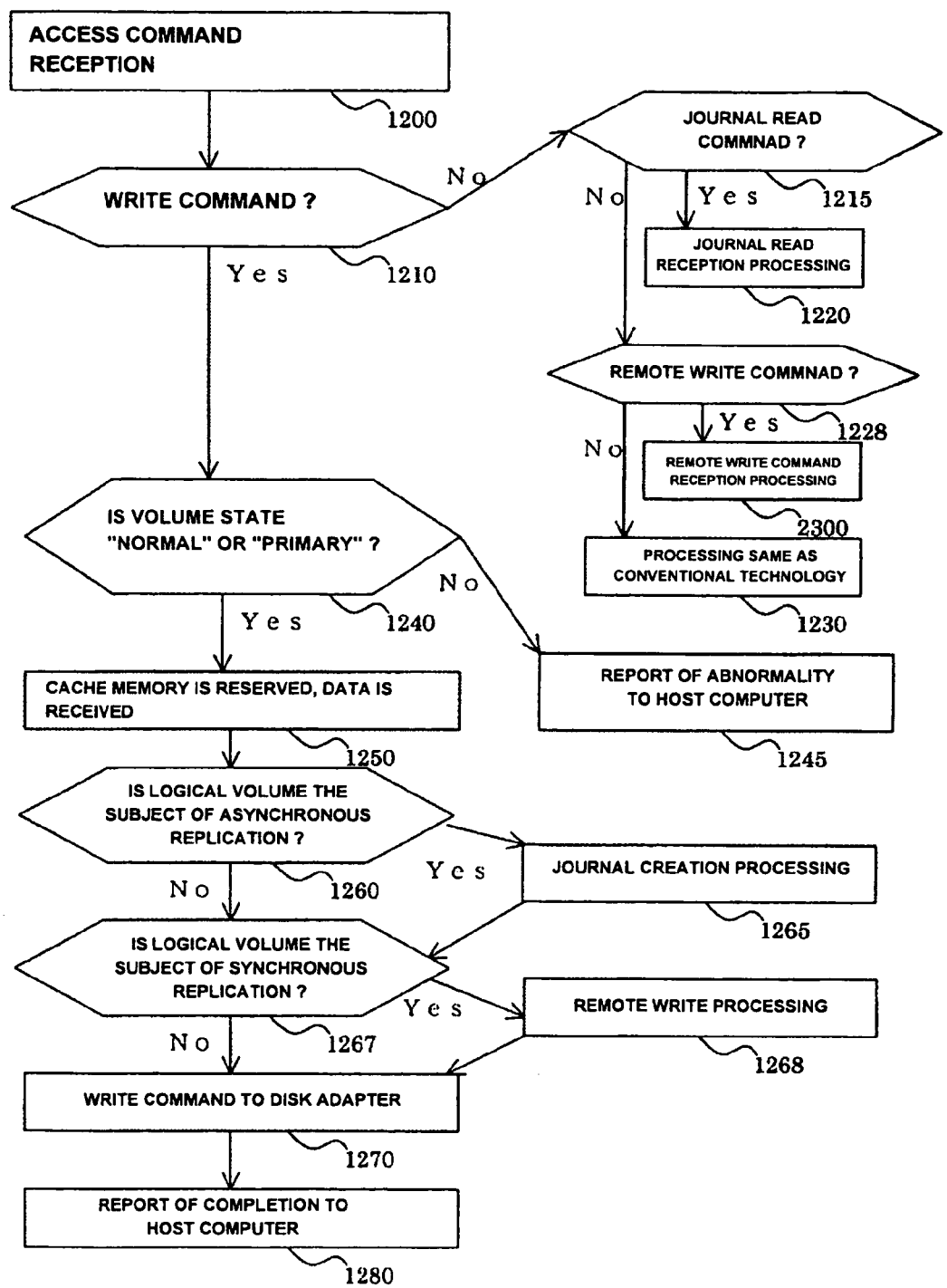
FIG. 12 is a flowchart of the command reception processing according to one embodiment of the present invention.
Figure 13:
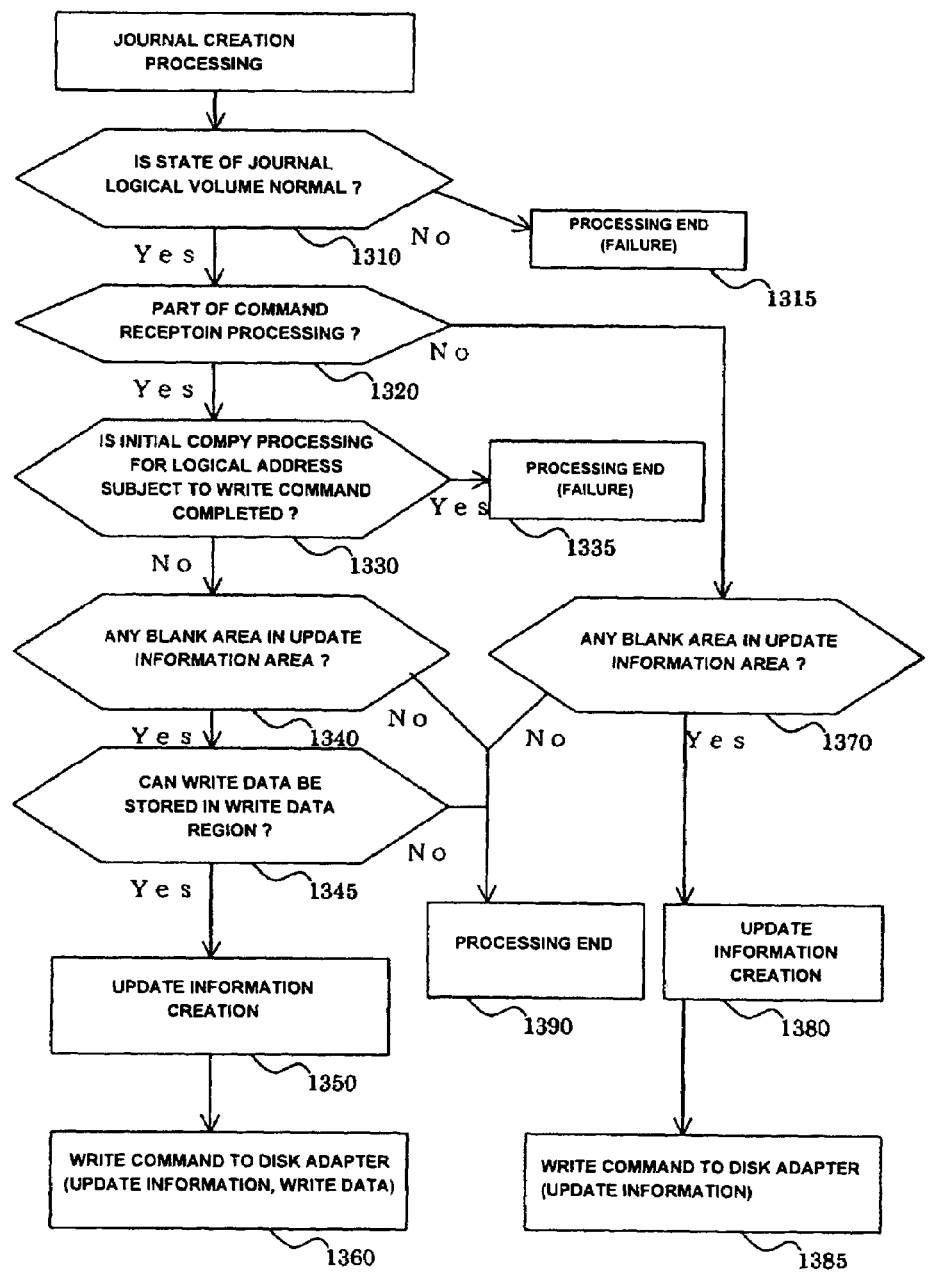
FIG. 13 is a flowchart of a journal creation processing according to one embodiment of the present invention.
Figure 23:
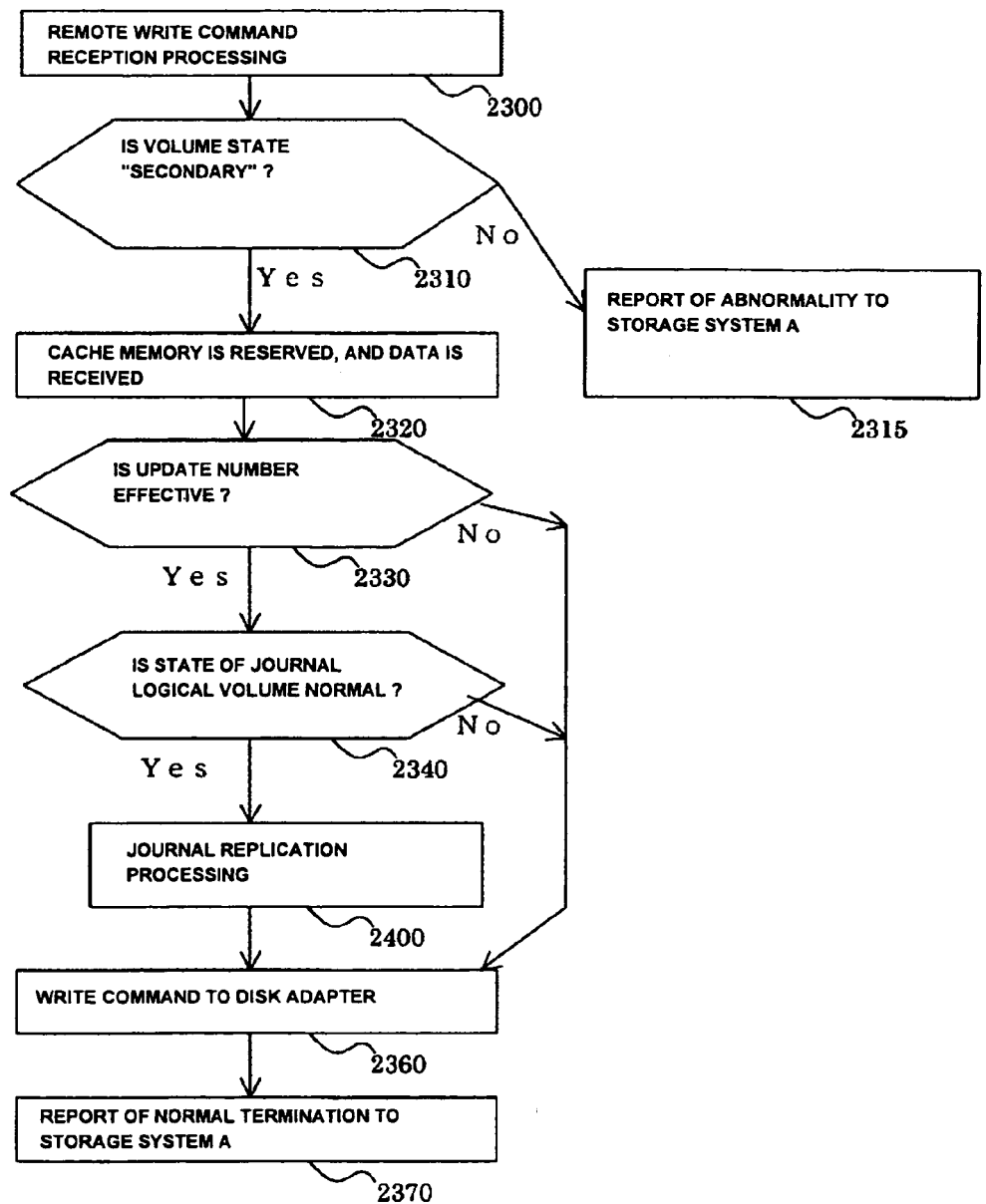
FIG. 23 is a flowchart of a remote write command reception processing according to one embodiment of the present invention.
Figure 24:
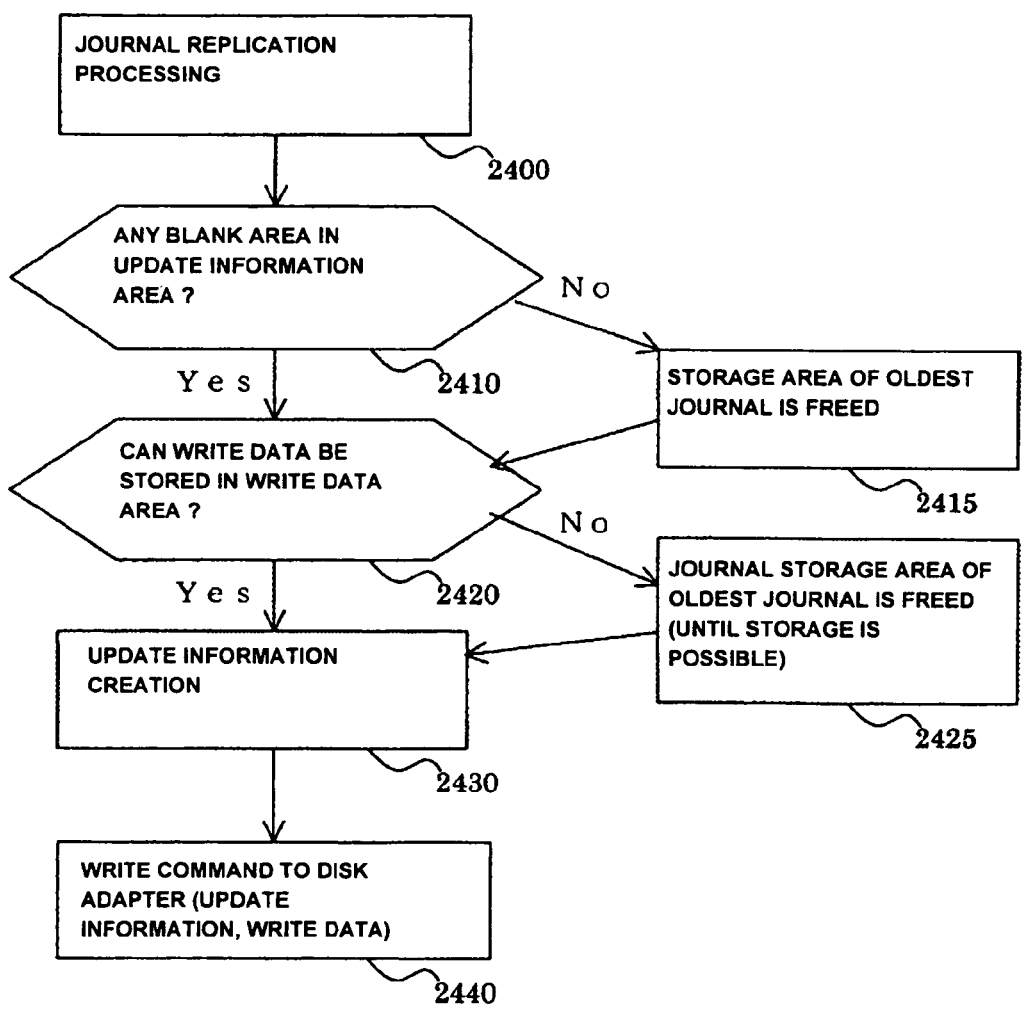
FIG. 24 is a flowchart of a journal replication processing according to one embodiment of the present invention.

FIG. 11 is a diagram illustrating the processing of the command reception processing 210; FIG. 12 is a flowchart of the command reception processing 210; FIG. 13 is a flowchart of a journal creation processing; FIG. 23 is a flowchart of a remote write command reception processing; and FIG. 24 is a flowchart of a journal replication processing. Next, by referring to these drawings, a description will be made as to an operation that takes place when the primary storage system 100A receives a write command from the host computer 180 to write to the logical volume 230 that is the subject of data replication.

(1) The host adapter A within the primary storage system 100A receives an access command from the host computer 180. The access command includes a command such as a read, write or journal read command, described later, as well as a logical address that is the subject of the command, and data amount. Hereinafter, the logical address shall be called a logical address A, the logical volume number a logical volume A, the position within the logical volume a position A within the logical volume, and the data amount a data amount A, in the access command (step 1200).

(2) The host adapter A checks the access command (steps 1210, 1215, 1228). If the access command is found through checking in step 1215 to be a journal read command, the host adapter A performs the journal read reception processing described later (step 1220). If the access command is found to be a remote write command, the host adapter A performs a remote write command reception processing described later (step 2300). If the access command is found to be a command other than these, such as a read command, the host adapter A performs a read processing according to conventional technologies (step 1230).

(3) If the access command is found through checking in step 1210 to be a write command, the host adapter A refers to the logical volume A in the volume information 400 and checks the volume state (step 1240). If the volume state of the logical volume A is found through checking in step 1240 to be other than "normal" or "primary," which indicates that the logical volume A cannot be accessed, the host adapter A reports to the host computer 180 that the processing ended abnormally (step 1245).

(4) If the volume state of the logical volume A is found through checking in step 1240 to be either "normal" or "primary," the host adapter A reserves at least one cache memory 130 and notifies the host computer 180 that the primary storage system 100A is ready to receive data. Upon receiving the notice, the host computer 180 sends write data to the primary storage system 100A. The host adapter A receives the write data and stores it in the cache memory 130 (step 1250; 1100 in FIG. 11).

(5) The host adapter A refers to the volume information, pair information and group information of the logical volume A and checks whether the logical volume A is the subject of asynchronous replication (step 1260). If through checking in step 1260 the volume state of the logical volume A is found to be "primary," the pair state of the pair with the asynchronous pair number that the logical volume A belongs to is "normal," and the group state of the group that the pair belongs to is "normal," these indicate that the logical volume A is the subject of asynchronous replication; consequently, the host adapter A performs the journal creation processing described later (step 1265).

(6) The host adapter A refers to the volume information, pair information and group information of the logical volume A and checks whether the logical volume A is the subject of synchronous replication (step 1267). If through checking in step 1267 the volume state of the logical volume A is found to be "primary," the pair state of the pair with the synchronous pair number that the logical volume A belongs to is "normal," and the group state of the group that the pair belongs to is "normal," these indicate that the logical volume A is the subject of synchronous replication; consequently, the host adapter A sends to the secondary storage system C having the logical volume that forms the pair with the synchronous pair number a remote write command to store the write data received from the host computer 180 (1185 in FIG. 11). The remote write command includes a write command, a logical address (where the logical volume is the secondary logical volume C that forms the pair with the synchronous pair number, and the position within the logical volume is the position A within the logical volume), data amount A, and the update number used in step 1265. Instead of the update number, the time at which the write command was received from the host computer 180 may be used. If the logical volume is found through checking in step 1267 not to be the logical volume that is the subject of synchronous replication, or if the journal creation processing in step 1265 is not successful, the host adapter A sets the numerical value "0," which indicates invalidity, as the update number.

(7) Upon receiving a response to step 1267 or to the remote write command in step 1268, the host adapter A commands the disk adapter 120 to write the write data to the storage area of the storage device 150 that corresponds to the logical address A (1160 in FIG. 11), and reports to the host computer 180 that the processing ended (steps 1270, 1280). Subsequently, the disk adapter 120 stores the write data in the storage area through the read/write processing (1170 in FIG. 11).

Next, the journal creation processing will be described.

(1) The host adapter A checks the volume state of the journal logical volume (step 1310). If the volume state of the journal logical volume is found through checking in step 1310 to be "abnormal," journals cannot be stored in the journal logical volume; consequently, the host adapter A changes the group state to "abnormal" and terminates the processing (step 1315). In such a case, the host adapter A converts the journal logical volume to a normal logical volume.

(2) If the journal logical volume is found through checking in step 1310 to be in the "normal" state, the host adapter A continues the journal creation processing. The journal creation processing entails different processing depending on whether the processing is part of an initial copy processing or a part of a command reception processing (step 1320). If the journal creation processing is a part of a command reception processing, the host adapter A performs the processing that begins with step 1330. If the journal creation processing is a part of an initial copy processing, the host adapter A performs the processing that begins with step 1370.

(3) If the journal creation processing is a part of a command reception processing, the host adapter A checks whether the logical address A that is the subject of writing is set as the subject of initial copy processing (step 1330). If the pair state of the logical volume A is "not copied," the host adapter A terminates the processing without creating any journals, since a journal creation processing will be performed later as part of an initial copy processing (step 1335). If the pair state of the logical volume A is "copying," and if the copy complete address is equal to or less than the position A within the logical address, the host adapter A terminates the processing without creating any journals, since a journal creation processing will be performed later as part of an initial copy processing (step 1335). Otherwise, i.e., if the pair state of the logical volume A is "copying" and if the copy complete address is greater than the position A within the logical address, or if the pair state of the logical volume A is "normal," the initial copy processing is already completed, and the host adapter A continues the journal creation processing.

(4) Next, the host adapter A checks whether a journal can be stored in the journal logical volume. The host adapter A uses the pointer information 700 to check whether there are any blank areas in the update information area (step 1340). If the update information latest address and the update information oldest address in the pointer information 700 are equal, which indicates that there are no blank areas in the update information area, the host adapter A terminates the processing due to a failure to create a journal (step 1390).

If a blank area is found in the update information area through checking in step 1340, the host adapter A uses the pointer information 700 to check whether the write data can be stored in the write data area (step 1345). If the write data oldest address falls within a range of the write data latest address and a numerical value resulting from adding the data amount A to the write data latest address, which indicates that the write data cannot be stored in the write data area, the host adapter A terminates the processing due to a failure to create a journal (step 1390).

(5) If the journal can be stored, the host adapter A obtains a logical address for storing the update number and update information, as well as a logical address for storing write data, and creates update information in at least one cache memory 130. The update number set in the group information 600 is a numerical value resulting from adding 1 to the update number of the subject group obtained from the group information 600. The logical address for storing the update information is the update information latest address in the pointer information 700, and a numerical value resulting from adding the size of the update information to the update information latest address is set as the new update information latest address in the pointer information 700. The logical address for storing the write data is the write data latest address in the pointer information 700, and a numerical value resulting from adding the data amount A to the write data latest address is set as the new write data latest address in the pointer information 700.

The host adapter A sets as the update information the numerical values obtained, the group number, the time at which the write command was received, the logical address A within the write command, and the data amount A (step 1350; 1120 in FIG. 11). For example, if a write command to write a data size of 100 beginning at position 800 from the head of the storage area of the primary logical volume 1 that belongs to group 1 in the state of the group information 600 shown in FIG. 6 and the pointer information 700 shown in FIG. 7 is received, the update information shown in FIG. 22 is created. The update number for the group information is 6, the update information latest address in the pointer information is 600 (the update information size is 100), and the write data latest address is 2300.

(6) The host adapter A commands the disk adapter 120 to write the update information and write data of the journal on the storage device 150 and ends the processing normally (step 1360; 1130, 1140 and 1150 in FIG. 11).

(7) If the journal creation processing is a part of an initial copy processing, the host adapter A performs the processing that begins with step 1370. The host adapter A checks whether a journal can be created. The host adapter A uses the pointer information 700 to check whether there are any blank areas in the update information area (step 1370). If the update information latest address and the update information oldest address in the pointer information 700 are equal, which indicates that there are no blank areas in the update information area, the host adapter A terminates the processing due to a failure to create a journal (step 1390). Since the write data of journals is read from the primary logical volume and no write data areas are used in the initial copy processing described in the present embodiment example, there is no need to check whether there are any blank areas in the write data area.

(8) If it is found through checking in step 1370 that a journal can be created, the host adapter A creates update information in at least one cache memory 130. The time the update number was obtained is set as the time the write command for the update information was received. The group number that a pair with an asynchronous pair number of the logical volume belongs to is set as the group number. The update number set in the group information 600 is a numerical value resulting from adding 1 to the update number obtained from the group information 600. The logical address that is the subject of the initial copy processing (copy complete address in the pair information) is set as the logical address of the write command and the logical address of the journal logical volume storing the write data. The unit size of the initial copy processing is set as the data size of the write data. The logical address for storing update information is the position of the update information latest address in the pointer information 700, and a numerical value resulting from adding the size of the update information to the update information latest address is set as the new update information latest address in the pointer information 700 (step 1380; 1120 in FIG. 11).

(9) The host adapter A commands the disk adapter 120 to write the update information to the storage device 150 and ends the processing normally (step 1385; 1140 and 1150 in FIG. 11).

Although the update information is described to be in at least one cache memory 130 according to the description above, the update information may be stored in at least one shared memory 140.

Write data does not have to be written to the storage device 150 asynchronously, i.e., immediately after step 1360 or step 1385. However, if the host computer 180 issues another command to write in the logical address A, the write data in the journal will be overwritten; for this reason, the write data in the journal must be written to the storage device 150 that corresponds to the logical address of the journal logical volume in the update information before the subsequent write data is received from the host computer 180. Alternatively, the write data can be saved in a different cache memory and later written to the storage device 150 that corresponds to the logical address of the journal logical volume in the update information.

Although journals are stored in the storage devices 150 according to the journal creation processing described, the cache memory 130 having a predetermined amount of memory for journals can be prepared in advance and the cache memory 130 can be used fully before the journals are stored in the storage device 150. The amount of cache memory for journals can be designated through the maintenance terminal, for example.

Next, a description will be made as to a processing that takes place when a host adapter C of the secondary storage system 100C receives a remote write command from the primary storage system 100A (a remote write command reception processing). A remote write command includes a write command, a logical address (a secondary logical volume C, a position A within the logical volume), a data amount A, and an update number.

(1) The host adapter C in the secondary system 100C refers to the volume information 400 for the logical volume C and checks the volume state of the secondary logical volume C (step 2310). If the volume state of the logical volume C is found through checking in step 2310 to be other than "secondary," which indicates that the logical volume C cannot be accessed, the host adapter C reports to the primary storage system 100A that the processing ended abnormally (step 2315).

(2) If the volume state of the logical volume C is found through checking in step 2310 to be "secondary," the host adapter C reserves at least one cache memory 130 and notifies the primary storage system 100A of its readiness to receive data. Upon receiving the notice, the primary storage system 100A sends write data to the secondary storage system 100C. The host adapter C receives the write data and stores it in the cache memory 130 (step 2320).

(3) The host adapter C checks the update number included in the remote write command and if the update number is the invalid value "0," which indicates that journals were not created in the primary storage system 100A, the host adapter C does not perform the journal replication processing in step 2400 (step 2330).

(4) The host adapter C checks the update number included in the remote write command and if the update number is a valid value (a value other than "0"), the host adapter C checks the volume state of the journal logical volume. If the volume state of the journal logical volume is "abnormal," which indicates that journals cannot be stored in the journal logical volume, the host adapter C does not perform the journal replication processing in step 2400 (step 2340).

(5) If the volume state of the journal logical volume is found through checking in step 2340 to be "normal," the host adapter C performs the journal replication processing 2400 described later.

(6) The host adapter C commands one of the disk adapters 120 to write the write data in the storage area of the storage device 150 that corresponds to the logical address in the remote write command, and reports to the primary storage system A that the processing has ended (steps 2360, 2370). Subsequently, the disk adapter 120 stores the write data in the storage area through the read/write processing.

Next, the journal replication processing 2400 will be described.

(1) The host adapter C checks whether a journal can be stored in the journal logical volume. The host adapter C uses the pointer information 700 to check whether there are any blank areas in the update information area (step 2410). If the update information latest address and the update information oldest address in the pointer information 700 are equal, which indicates that there are no blank areas in the update information area, the host adapter C frees the storage area of the oldest journal and reserves an update information area (step 2415). Next, the host adapter C uses the pointer information 700 to check whether the write data can be stored in the write data area (step 2420). If the write data oldest address is within a range of the write data latest address and a numerical value resulting from adding the data amount A to the write data latest address, which indicates that the write data cannot be stored in the write data area, the host adapter C frees the journal storage area of the oldest journal and makes it possible to store the write data (step 2425).

(2) The host adapter C creates update information in at least one cache memory 130. The update time in the remote write command is set as the time the write command for the update information was received. The group number that a pair with a synchronous pair number in the logical volume C belongs to is set as the group number. The update number in the remote write command is set as the update number. The logical address in the remote write command is set as the logical address of the write command. The data size A in the remote write command is set as the data size of the write data. The logical address of the journal logical volume for storing write data is the write data latest address in the pointer information 700, and a numerical value resulting from adding the size of the write data to the write data latest address is set as the write data latest address in the pointer information 700. The logical address for storing the update information is the update information latest address in the pointer information 700, and a numerical value resulting from adding the size of the update information to the update information latest address is set as the update information latest address in the pointer information 700 (step 2430).

(3) The host adapter C commands one of the disk adapters 120 to write the update information and write data to at least one storage device 150, and ends the processing as a successful journal creation (step 2440). Subsequently, the disk adapter 120 writes the update information and the write data to the storage device 150 through the read/write processing and frees the cache memory 130.

In this way, the secondary storage system C frees storage areas of old journals and constantly maintains a plurality of new journals.

The read/write processing 220 is a processing that the disk adapters 120 implement upon receiving a command from the host adapters 110 or the disk adapters 120. The processing implemented are a processing to write data in the designated cache memory 130 to a storage area in the storage device 150 that corresponds to the designated logical address, and a processing to read data to the designated cache memory 130 from a storage area in the storage device 150 that corresponds to the designated logical address.

Figure 14:
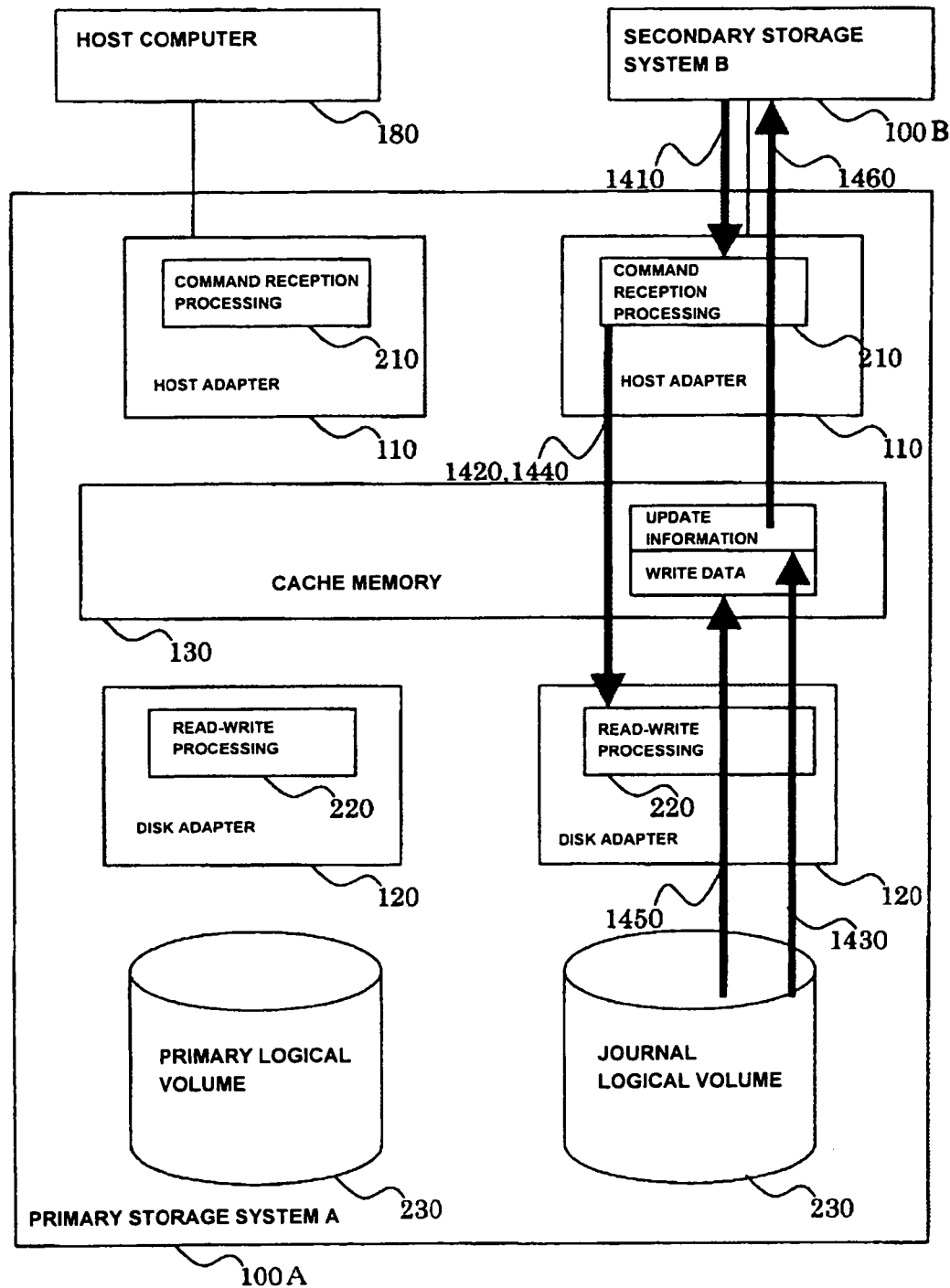
FIG. 14 is a diagram illustrating a journal read reception processing according to one embodiment of the present invention.
Figure 15:
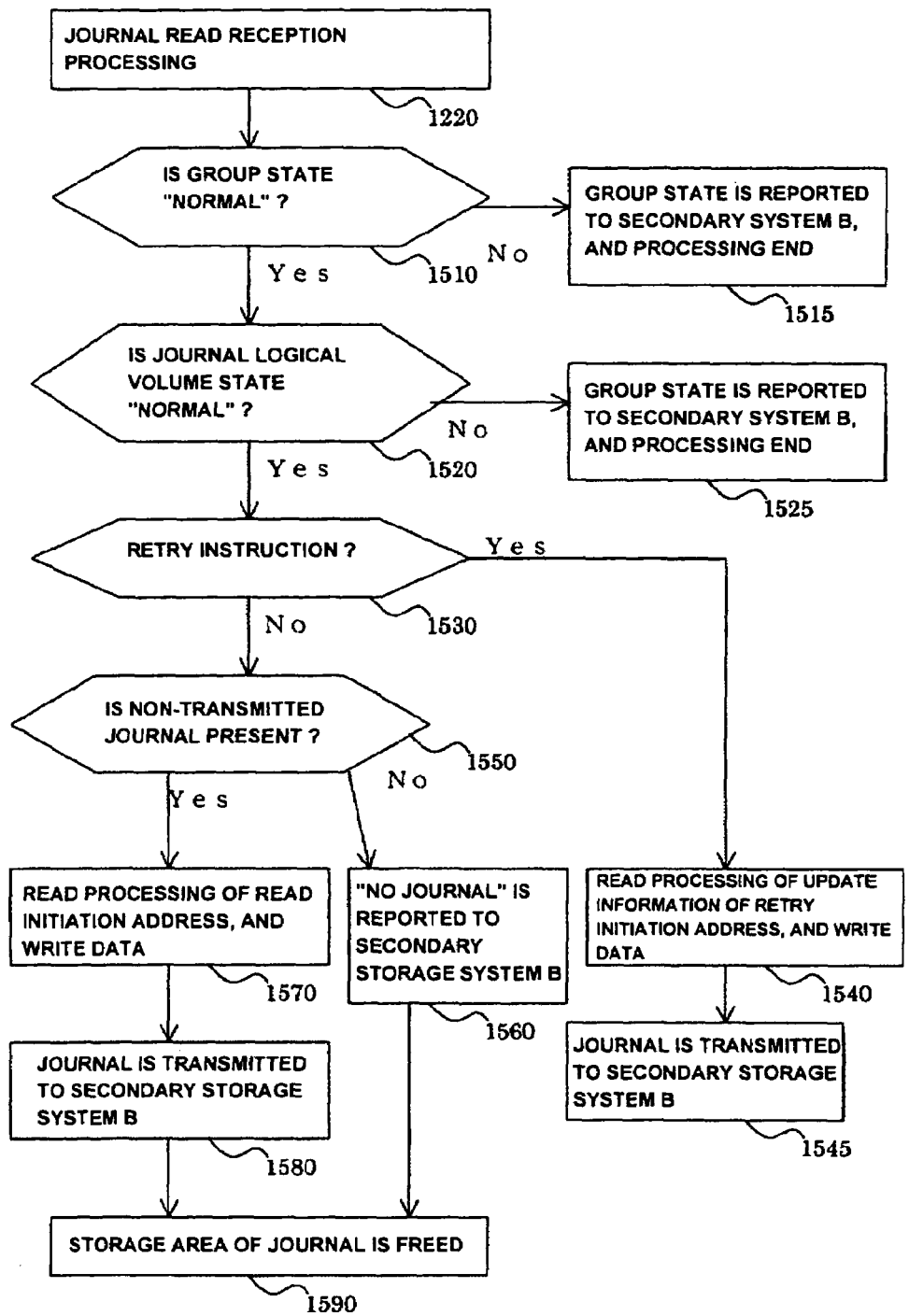
FIG. 15 is a flowchart of the journal read reception processing according to one embodiment of the present invention.

FIG. 14 is a diagram illustrating the operation (a journal read reception processing) by a host adapter A of the primary storage system 100A upon receiving a journal read command, and FIG. 15 is a flowchart of the operation. Below, these drawings are used to describe the operation that takes place when the primary storage system 100A receives a journal read command from the secondary storage system 100B.

(1) The host adapter A in the primary storage system 100A receives an access command from the secondary system 100B. The access command includes an identifier indicating that the command is a journal read command, a group number that is the subject of the command, and whether there is a retry instruction. In the following, the group number within the access command shall be called a group number A (step 1220; 1410 in FIG. 14).

(2) The host adapter A checks whether the group state of the group number A is "normal" (step 1510). If the group state is found through checking in step 1510 to be other than "normal," such as "abnormal," the host adapter A notifies the secondary storage system 100B of the group state and terminates the processing. The secondary storage system 100B performs processing according to the group state received. For example, if the group state is "abnormal," the secondary storage system 100B terminates the journal read processing (step 1515).

(3) If the group state of the group number A is found through checking in step 1510 to be "normal," the host adapter A checks the state of the journal logical volume (step 1520). If the volume state of the journal logical volume is found through checking in step 1520 not to be "normal," such as "abnormal," the host adapter A changes the group state to "abnormal," notifies the secondary storage system 100B of the group state, and terminates the processing. The secondary storage system 100B performs processing according to the group state received. For example, if the group state is "abnormal," the secondary storage system 100B terminates the journal read processing (step 1525).

(4) If the volume state of the journal logical volume is found through checking in step 1520 to be "normal," the host adapter A checks whether the journal read command is a retry instruction (step 1530).

(5) If the journal read command is found through checking in step 1530 to be a retry instruction, the host adapter A re-sends to the secondary storage system 100B the journal it had sent previously. The host adapter A reserves at least one cache memory 130 and commands one of the disk adapters 120 to read to the cache memory 130 information concerning the size of update information beginning at the retry head address in the pointer information 700 (1420 in FIG. 14).

In the read/write processing, the disk adapter 120 reads the update information from at least one storage device 150, stores the update information in the cache memory 130, and notifies of it to the host adapter A (1430 in FIG. 14).

The host adapter A receives the notice of the end of the update information reading, obtains the write data logical address and write data size from the update information, reserves at least one cache memory 130, and commands the disk adapter 120 to read the write data to the cache memory 130 (step 1540; 1440 in FIG. 14).

In the read/write processing, the disk adapter 120 reads the write data from the storage device 150, stores the write data in the cache memory 130, and notifies of it to the host adapter A (1450 in FIG. 14).

The host adapter A receives the notice of the end of write data reading, sends the update information and write data to the secondary storage system 100B, frees the cache memory 130 that has the journal, and terminates the processing (step 1545; 1460 in FIG. 14).

(6) If the journal read command is found through checking in step 1530 not to be a retry instruction, the host adapter A checks whether there is any journal that has not been sent; if there is such a journal, the host adapter A sends the journal to the secondary storage system 100B. The host adapter A compares the read head address to the update information latest address in the pointer information 700 (step 1550).

If the read head address and the update information latest address are equal, which indicates that all journals have been sent to the secondary storage system 100B, the host adapter A sends "no journals" to the secondary storage system 100B (step 1560) and frees the storage area of the journal that was sent to the secondary storage system 100B when the previous journal read command was processed (step 1590).

In the freeing processing of the journal storage area, a retry head address is set as the update information oldest address in the pointer information 700. If the update information oldest address becomes the write data area head address, the update information oldest address is set to 0. The write data oldest address in the pointer information 700 is changed to a numerical value resulting from adding to the write data oldest address the size of the write data sent in response to the previous journal read command. If the write data oldest address becomes a logical address in excess of the capacity of the journal logical volume, the write data area head address is assigned a lower position and corrected.

(7) If an unsent journal is found through checking in step 1550, the host adapter A reserves at least one cache memory 130 and commands one of the disk adapters 120 to read to the cache memory 130 information concerning the size of update information beginning at the read head address in the pointer information 700 (1420 in FIG. 14).

In the read/write processing, the disk adapter 120 reads the update information from at least one storage device 150, stores the update information in the cache memory 130, and notifies of it to the host adapter A (1430 in FIG. 14).

The host adapter A receives the notice of the end of the update information reading, obtains the write data logical address and write data size from the update information, reserves at least one cache memory 130, and commands the disk adapter 120 to read the write data to the cache memory 130 (step 1570; 1440 in FIG. 14).

In the read/write processing, the disk adapter 120 reads the write data from the storage device 150, stores the write data in the cache memory 130, and notifies of it to the host adapter A (1450 in FIG. 14).

The host adapter A receives the notice of the end of the write data reading, sends the update information and write data to the secondary storage system 100B (step 1580) and frees the cache memory 130 that has the journal (1460 in FIG. 14). The host adapter A then sets the read head address as the retry head address, and a numerical value resulting from adding the update information size of the journal sent to the read head address as the new read head address, in the pointer information 700.

(8) The host adapter A frees the storage area of the journal that was sent to the secondary storage system 100B when the previous journal read command was processed (step 1590).

Although the primary storage system 100A sends journals one at a time to the secondary storage system 100B according to the journal read reception processing described, a plurality of journals may be sent simultaneously to the secondary storage system 100B. The number of journals to be sent in one journal read command can be designated in the journal read command by the secondary storage system 100B, or the user can designate the number in the primary storage system 100A or the secondary storage system 100B when registering groups. Furthermore, the number of journals to be sent in one journal read command can be dynamically varied according to the transfer capability of or load on the connection paths 200 between the primary storage system 100A and the secondary storage system 100B. Moreover, instead of designating the number of journals to be sent, the amount of journals to be transferred may be designated upon taking into consideration the size of journal write data.

Although journals are read from at least one storage device 150 to at least one cache memory 130 according to the journal read reception processing described, this processing is unnecessary if the journals are already in the cache memory 130.

Although the freeing processing of journal storage area in the journal read reception processing described is to take place during the processing of the next journal read command, the storage area can be freed immediately after the journal is sent to the secondary storage system 100B. Alternatively, the secondary storage system 100B can set in the journal read command an update number that may be freed, and the primary storage system 100A can free the journal storage area according to the instruction.

Figure 16:
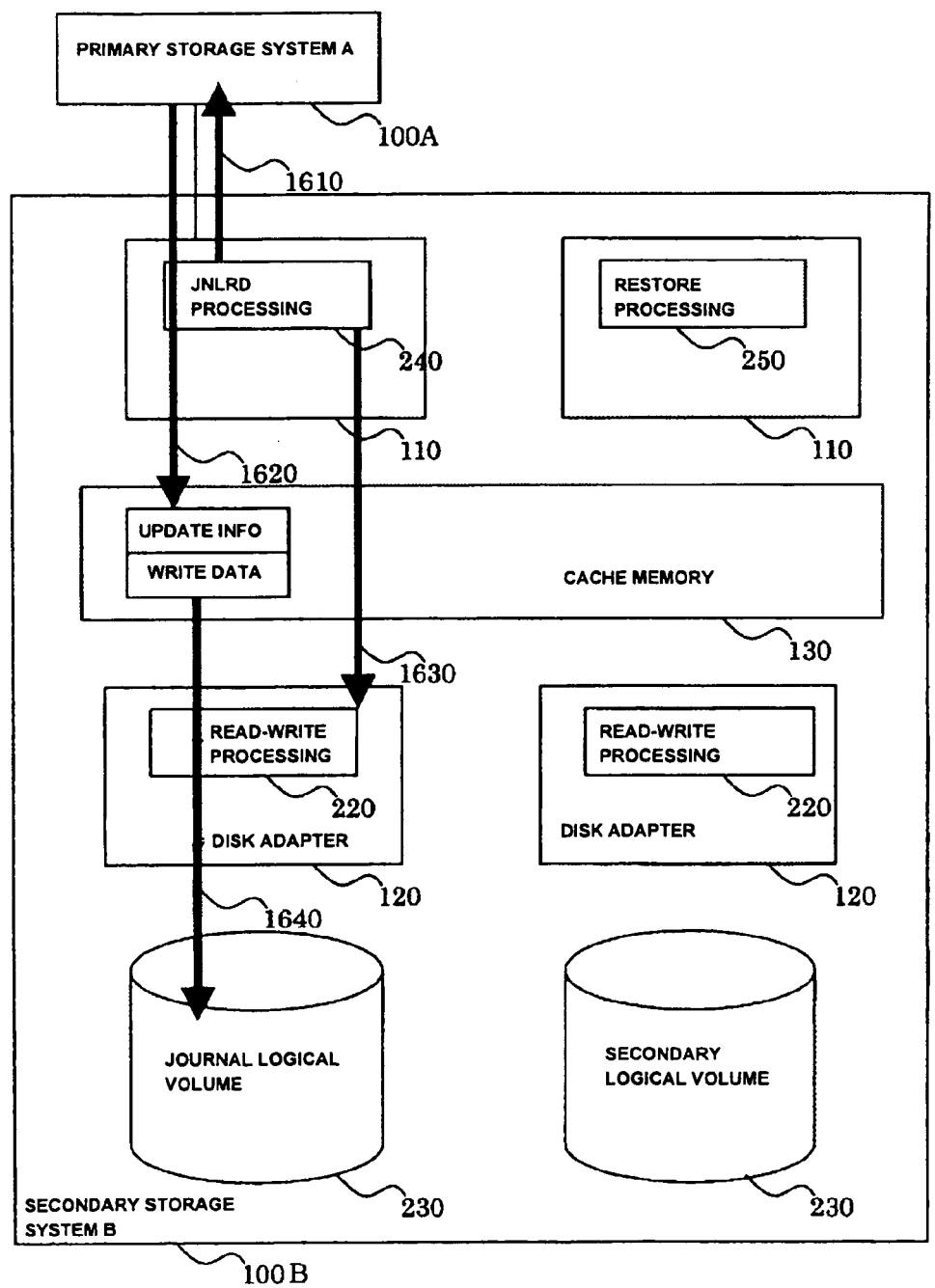
FIG. 16 is a diagram illustrating a journal read processing according to one embodiment of the present invention.
Figure 17:
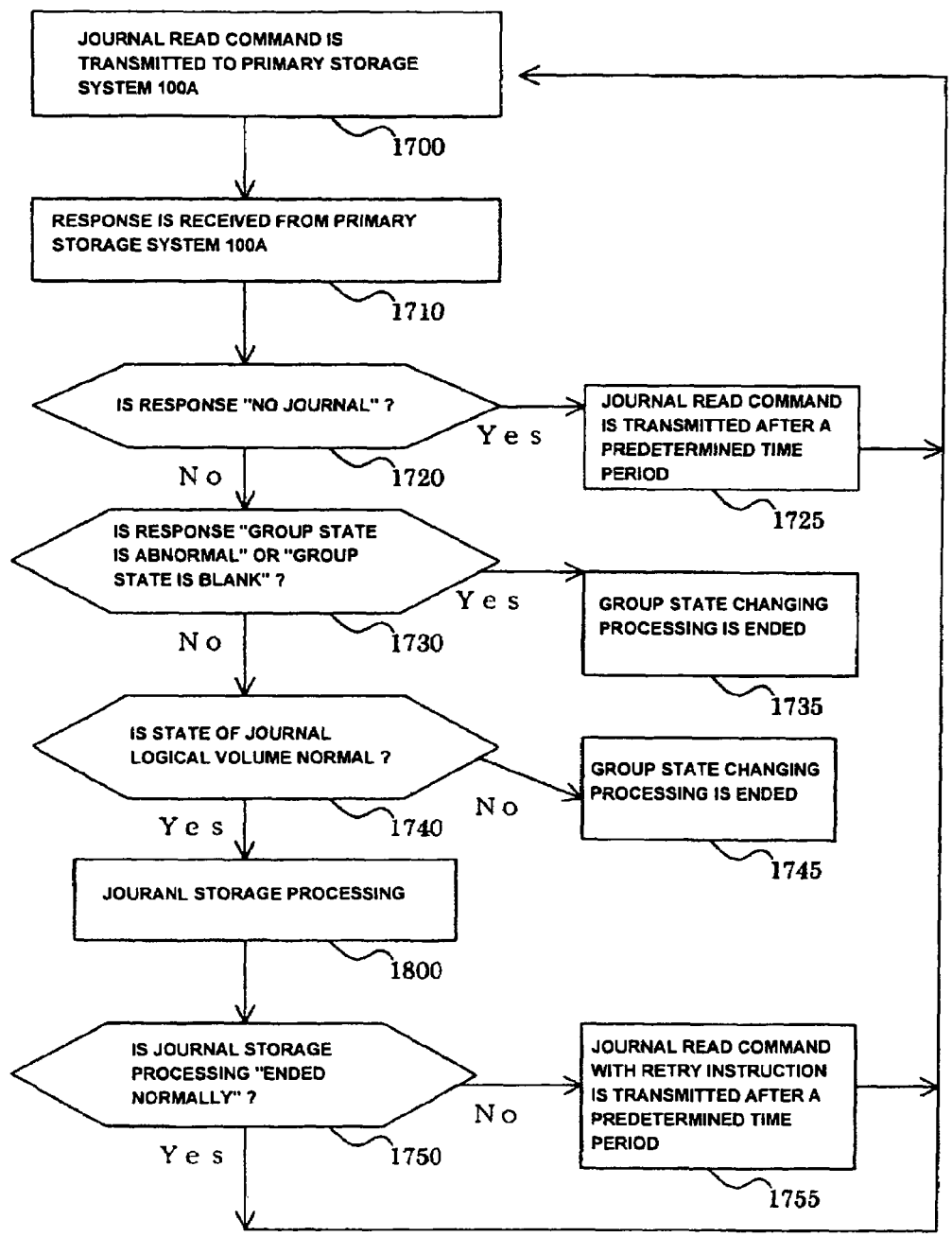
FIG. 17 is a flowchart of the journal read processing according to one embodiment of the present invention.
Figure 18:
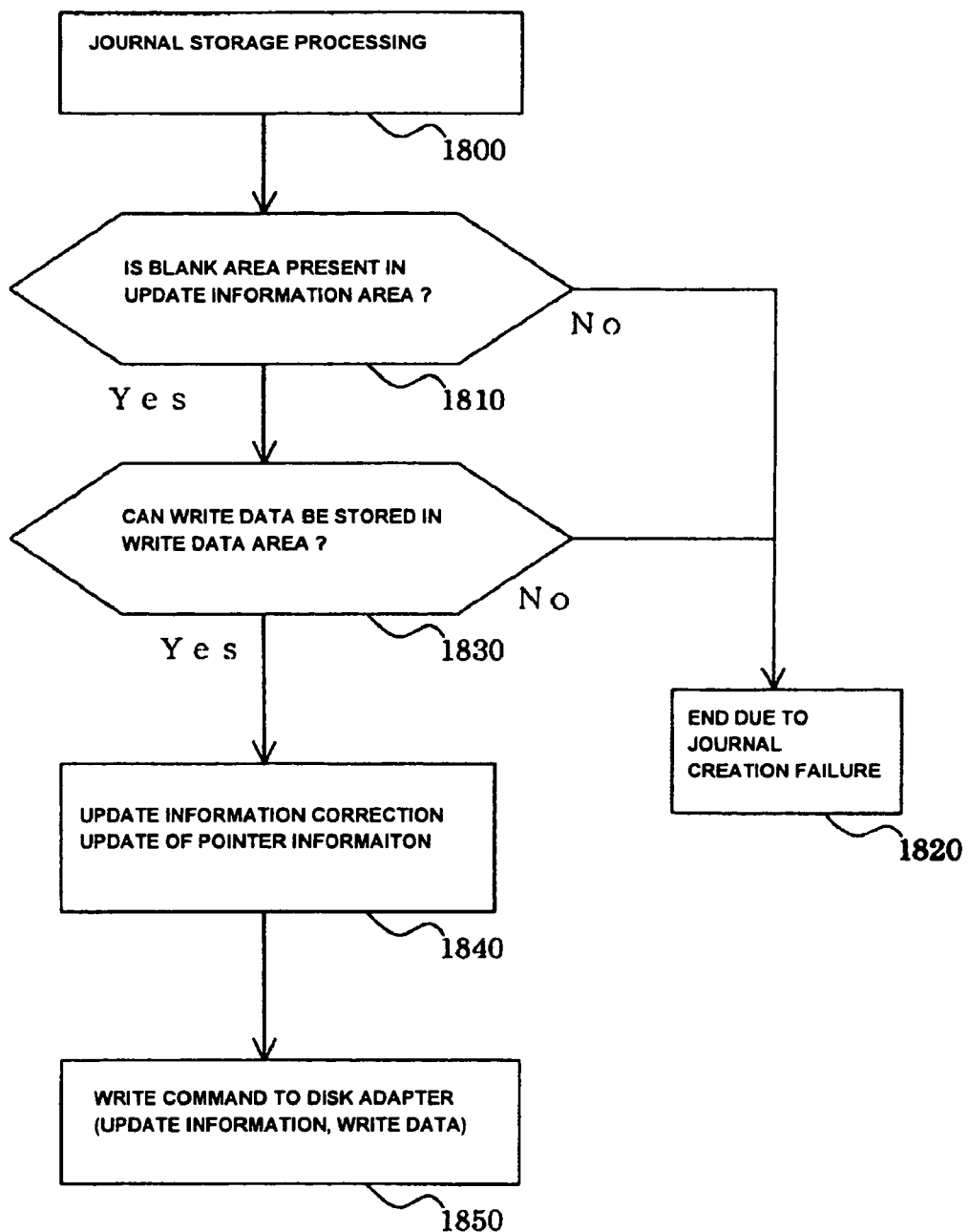
FIG. 18 is a flowchart of a journal store processing according to one embodiment of the present invention.

FIG. 16 is a diagram illustrating the journal read processing 240, FIG. 17 is the flowchart of it, and FIG. 18 is a flowchart of a journal store processing. Below, an operation by a host adapter B of the secondary storage system 100B to read journals from the primary storage system 100A and store the journals in a journal logical volume is described below using these drawings.

(1) If the group state is "normal" and the replication type is asynchronous, the host adapter B in the secondary storage system 100B reserves at least one cache memory 130 for storing a journal, and sends to the primary storage system 100A an access command that includes an identifier indicating that the command is a journal read command, a group number of the primary storage system 100A that is the subject of the command, and whether there is a retry instruction. Hereinafter, the group number in the access command shall be called a group number A (step 1700, 1610 in FIG. 16).

(2) The host adapter B receives a response and a journal from the primary storage system 100A (1620 in FIG. 16).

(3) The host adapter B checks the response; if the response from the primary storage system 100A is "no journals," which indicates that there are no journals that belong to the designated group in the primary storage system 100A, the host adapter B sends a journal read command to the primary storage system 100A after a predetermined amount of time (steps 1720, 1725).

(4) If the response from the primary storage system 100A is "the group state is abnormal" or "the group state is blank," the host adapter B changes the group state of the secondary storage system 100B to the state received and terminates the journal read processing (steps 1730, 1735).

(5) If the response from the primary storage system 100A is other than those described above, i.e., if the response is that the group state is "normal," the host adapter B checks the volume state of the corresponding journal logical volume (step 1740). If the volume state of the journal logical volume is "abnormal," which indicates that journals cannot be stored in the journal logical volume, the host adapter B changes the group state to "abnormal" and terminates the processing (step 1745). In this case, the host adapter B converts the journal logical volume to a normal logical volume and returns the group state to normal.

(6) If the volume state of the journal logical volume is found through checking in step 1740 to be "normal," the host adapter B performs a journal store processing 1800 described later. If the journal store processing 1800 ends normally, the host adapter B sends the next journal read command. Alternatively, the host adapter B can send the next journal read command after a predetermined amount of time has passed (step 1700). The timing for sending the next journal command can be a periodic transmission based on a predetermined interval, or it can be determined based on the number of journals received, the communication traffic volume on the connection paths 200, the storage capacity for journals that the secondary storage system 100B has, or on the load on the secondary storage system 100B. The timing can also be determined based on the storage capacity for journals that the primary storage system 100A has or on a numerical value in the pointer information 700 of the primary storage system 100A as read from the secondary storage system 100B. The transfer of the information can be done through a dedicated command or as part of a response to a journal read command. The subsequent processing is the same as the processing that follows step 1700.

(7) If the journal store processing in step 1800 does not end normally, which indicates that there are insufficient blank areas in the journal logical volume, the host adapter B cancels the journal received and sends a journal read command in a retry instruction after a predetermined amount of time (step 1755). Alternatively, the host adapter B can retain the journal in the cache memory 130 and perform the journal store processing again after a predetermined amount of time. This is due to the fact that there is a possibility that there would be more blank areas in the journal logical volume after a predetermined amount of time as a result of a restore processing 250, described later. If this method is used, it is unnecessary to indicate whether there is a retry instruction in the journal read command.

Next, the journal store processing 1800 shown in FIG. 18 will be described.

(1) The host adapter B checks whether a journal can be stored in the journal logical volume. The host adapter B uses the pointer information 700 to check whether there are any blank areas in the update information area (step 1810). If the update information latest address and the update information oldest address in the pointer information 700 are equal, which indicates that there are no blank areas in the update information area, the host adapter B terminates the processing due to a failure to create a journal (step 1820).

(2) If blank areas are found in the update information area through checking in step 1810, the host adapter B uses the pointer information 700 to check whether the write data can be stored in the write data area (step 1830). If the write data oldest address falls within a range of the write data latest address and a numerical value resulting from adding the data amount A to the write data latest address, the write data cannot be stored in the write data area; consequently, the host adapter B terminates the processing due to a failure to create a journal (step 1820).

(3) If the journal can be stored, the host adapter B changes the group number and the logical address of the journal logical volume for storing write data of the update information received. The group number is changed to the group number of the secondary storage system 100B, and the logical address of the journal logical volume is changed to the write data latest address in the pointer information 700. Furthermore, the host adapter B changes the update information latest address to a numerical value resulting from adding the size of the update information to the update information latest address, and the write data latest address to a numerical value resulting from adding the size of the write data to the write data latest address, in the pointer information 700. Moreover, the host adapter B changes the update number in the group information 600 to the update number of the update information received (step 1840).

(4) The host adapter B commands one of the disk adapters 120 to write the update information and write data to at least one storage device 150, and ends the processing as a successful journal creation (step 1850; 1630 in FIG. 16). Subsequently, the disk adapter 120 writes the update information and the write data to the storage device 150 through the read/write processing and frees the cache memory 130 (1640 in FIG. 16).

Although the journals are stored in the storage devices 150 according to the journal creation processing described, the cache memory 130 having a predetermined amount of memory for journals can be prepared in advance and the cache memory 130 can be used fully before the journals are stored in the storage device 150. The amount of cache memory for journals can be designated through the maintenance terminal, for example.

Figure 19:
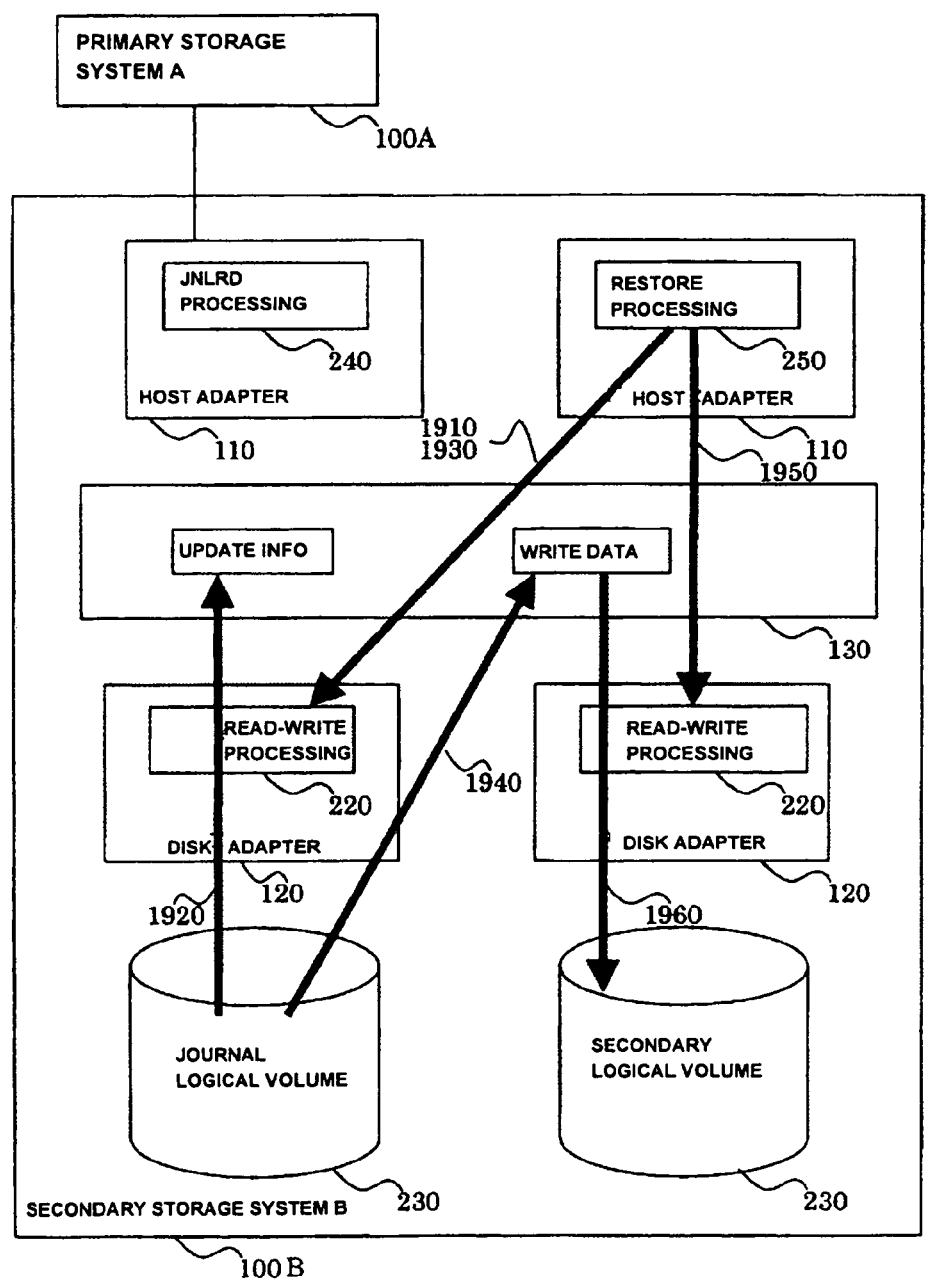
FIG. 19 is a diagram illustrating a restore processing according to one embodiment of the present invention.
Figure 20:
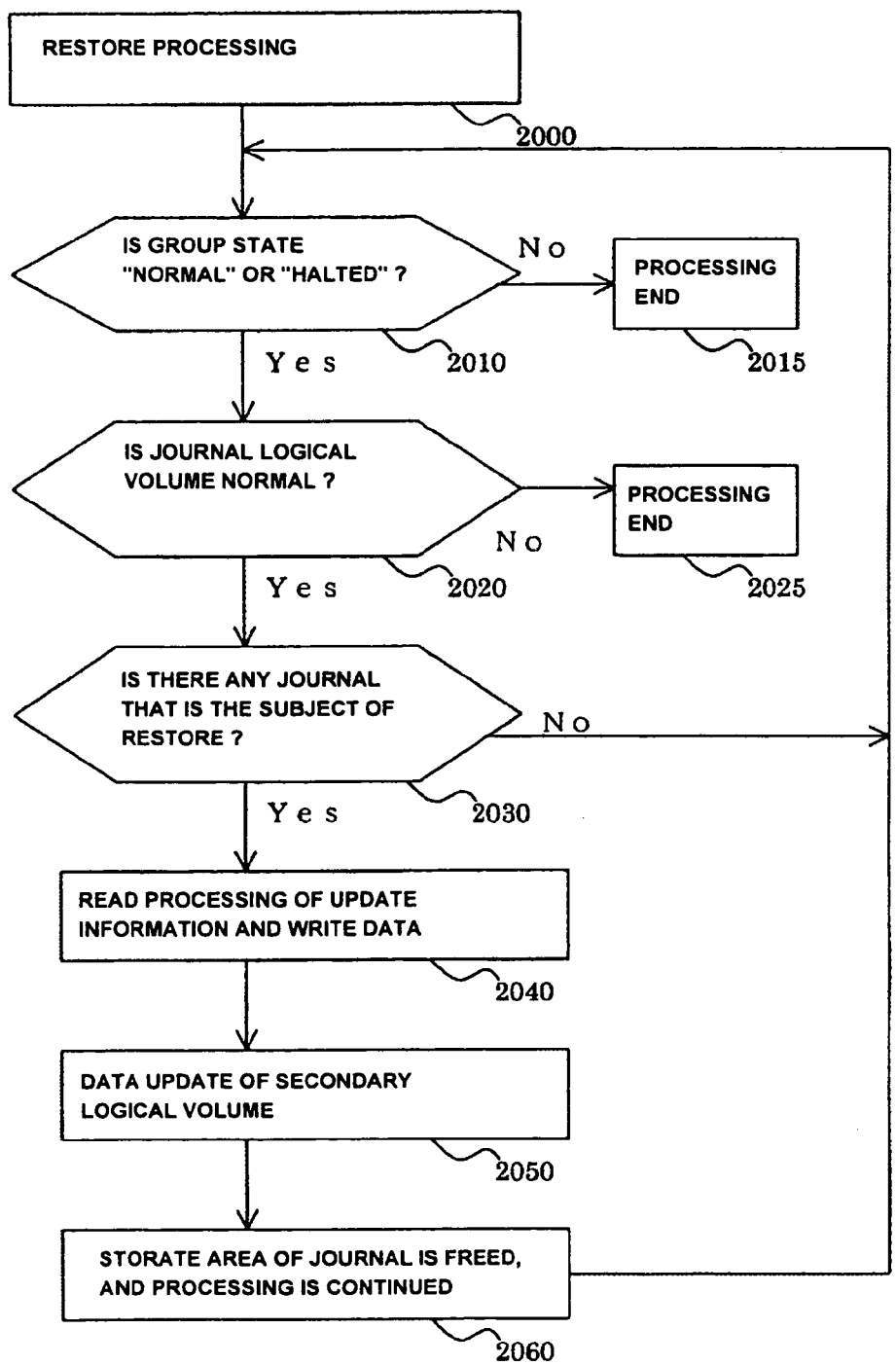
FIG. 20 is a flowchart of the restore processing according to one embodiment of the present invention.

FIG. 19 is a diagram illustrating the restore processing 250, and FIG. 20 is a flowchart of it. Below, an operation by the host adapter B of the secondary storage system 100B to utilize journals in order to update data is described below using these drawings. The restore processing 250 can be performed by one of the disk adapters 120 of the secondary storage system 100B.

(1) The host adapter B checks if the group state of the group number B is "normal" or "halted" (step 2010). If the group state is found through checking in step 2010 to be other than "normal" or "halted," such as "abnormal," the host adapter B terminates the restore processing (step 2015).

(2) If the group state is found through checking in step 2010 to be "normal" or "halted," the host adapter B checks the volume state of the corresponding journal logical volume (step 2020). If the volume state of the journal logical volume is found through checking in step 2020 to be "abnormal," which indicates that the journal logical volume cannot be accessed, the host adapter B changes the group state to "abnormal" and terminates the processing (step 2025).

(3) If the volume state of the journal logical volume is found to be "normal" through checking in step 2020, the host adapter B checks whether there is any journal that is the subject of restore. The host adapter B obtains the update information oldest address and the update information latest address in the pointer information 700. If the update information oldest address and the update information latest address are equal, there are no journals that are the subject of restore; consequently, the host adapter B terminates the restore processing for the time being and resumes the restore processing after a predetermined amount of time (step 2030).

(4) If a journal that is the subject of restore is found through checking in step 2030, the host adapter B performs the following processing on the journal with the oldest (i.e., smallest) update number. The update information for the journal with the oldest (smallest) update number is stored beginning at the update information oldest address in the pointer information 700. The host adapter B reserves at least one cache memory 130 and commands one of the disk adapters 120 to read to the cache memory 130 information concerning the size of update information from the update information oldest address (1910 in FIG. 19).

In the read/write processing, the disk adapter 120 reads the update information from at least one storage device 150, stores the update information in the cache memory 130, and notifies of it to the host adapter B (1920 in FIG. 19).

The host adapter B receives the notice of the end of the update information reading, obtains the write data logical address and write data size from the update information, reserves at least one cache memory 130, and commands the disk adapter 120 to read the write data to the cache memory 130 (1930 in FIG. 19).

In the read/write processing, the disk adapter 120 reads the write data from the storage device 150, stores the write data in the cache memory 130, and notifies of it to the host adapter B (step 2040; 1940 in FIG. 19).

(5) The host adapter B finds from the update information the logical address of the secondary logical volume to be updated, and commands one of the disk adapters 120 to write the write data to the secondary logical volume (step 2050; 1950 in FIG. 19). In the read/write processing, the disk adapter 120 writes the data to the storage device 150 that corresponds to the logical address of the secondary logical volume, frees the cache memory 130, and notifies of it to the host adapter B (1960 in FIG. 19).

(6) The host adapter B receives the notice of write processing completion from the disk adapter 120 and frees the storage area for the journal. In the freeing processing of the journal storage area, the update information oldest address in the pointer information 700 is changed to a numerical value resulting from adding the size of the update information thereto. If the update information oldest address becomes the write data area head address, the update information oldest address is set to 0. The write data oldest address in the pointer information 700 is changed to a numerical value resulting from adding the size of the write data to the write data oldest address. If the write data oldest address becomes a logical address in excess of the capacity of the journal logical volume, the write data area head address is assigned a lower position and corrected. The host adapter B then begins the next restore processing (step 2060).

Although journals are read from at least one storage device 150 to at least one cache memory 130 in the restore processing 250, this processing is unnecessary if the journals are already in the cache memories 130.

Although the primary storage system 100A determines which journals to send based on the pointer information 700 in the journal read reception processing and the journal read processing 240 described, the journals to be sent may instead be determined by the secondary storage system 100B. For example, an update number can be added to the journal read command. In this case, in order to find the logical address of the update information with the update number designated by the secondary storage system 100B in the journal read reception processing, a table or a search method for finding a logical address storing the update information based on the update number can be provided in the shared memories 140 of the primary storage system 100A.

Although the journal read command is used in the journal read reception processing and the journal read processing 240 described, a normal read command may be used instead. For example, the group information 600 and the pointer information 700 for the primary storage system 100A can be transferred to the secondary storage system 100B in advance, and the secondary storage system 100B can read data in the journal logical volume (i.e., journals) of the primary storage system 100A.

Although journals have been described as being sent from the primary storage system 100A to the secondary storage system 100B in the order of update numbers in the journal read reception processing, the journals do not have to be sent in the order of update numbers. Furthermore, a plurality of journal read commands may be sent from the primary storage system 100A to the secondary storage system 100B. In this case, in order to process journals in the order of update numbers in the restore processing, a table or a search method for finding a logical address storing update information based on each update number is provided in the secondary storage system 100B.

In the data processing system according to the present invention described, the storage system A stores information concerning data update as journals. The storage system B has a replication of data that the storage system A has; the storage system B obtains journals from the storage system A in an autonomic manner and uses the journals to update its data that correspond to data of the storage system A in the order of data update in the storage system A. Through this, the storage system B can replicate data of the storage system A, while maintaining data integrity. Furthermore, management information for managing journals does not rely on the capacity of data that is the subject of replication.

Figure 25:
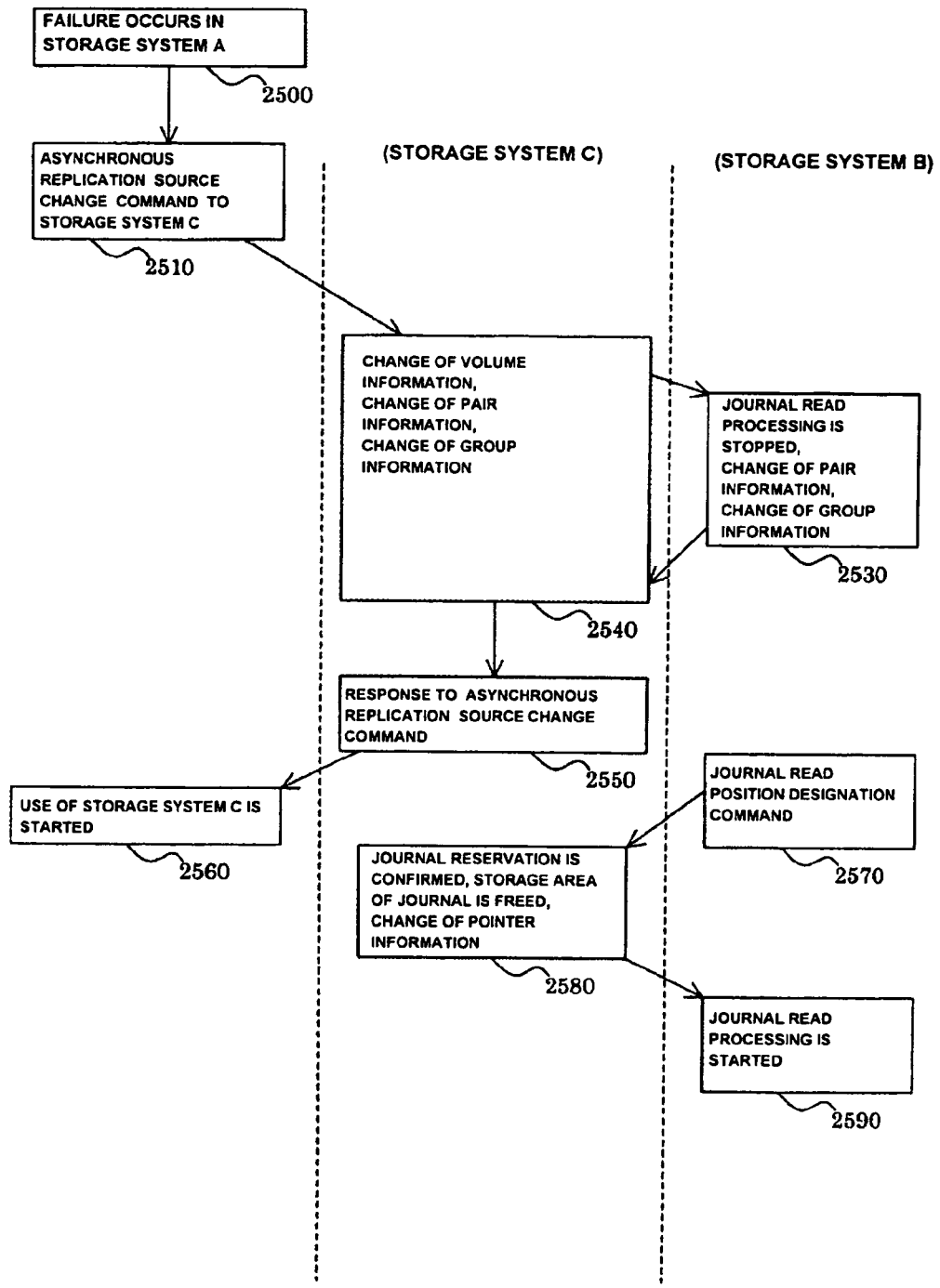
FIG. 25 is a flowchart illustrating the procedure for resuming data replication among storage systems in the event a primary storage system 100A fails according to one embodiment of the present invention.
Figure 42:
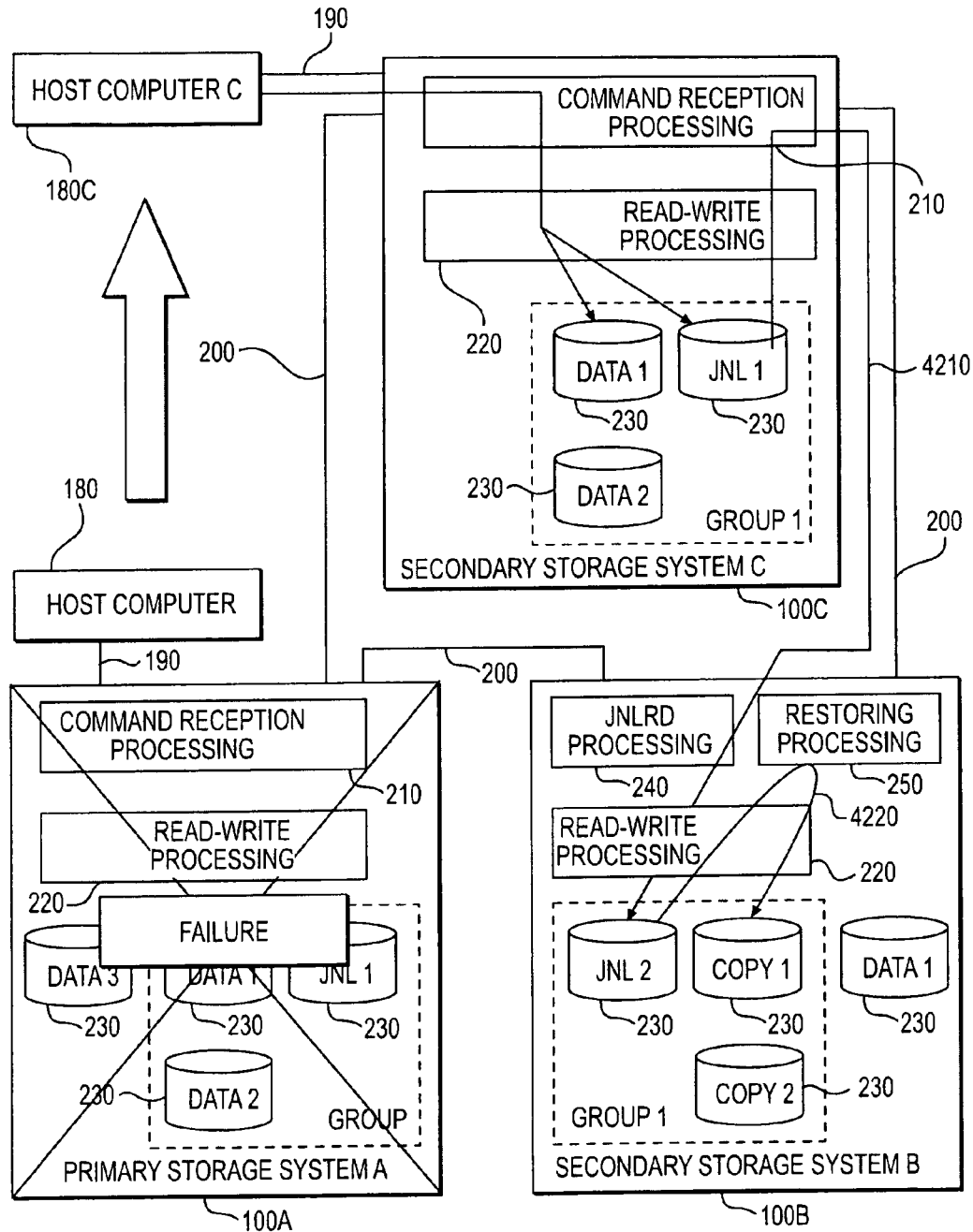
FIG. 42 is a block diagram illustrating the operation that takes place in the event the primary storage system 100A fails according to one embodiment of the present invention.

The procedure for using a host computer 180C and the storage system 100C to resume the information processing performed by the host computer 180 and to resume data replication on the storage system 100B in the event the primary storage system 100A fails is shown in FIG. 25; a block diagram of the logical configuration of the procedure is shown in FIG. 42. The host computer 180 and the host computer 180C may be the same computer.

Figure 30:
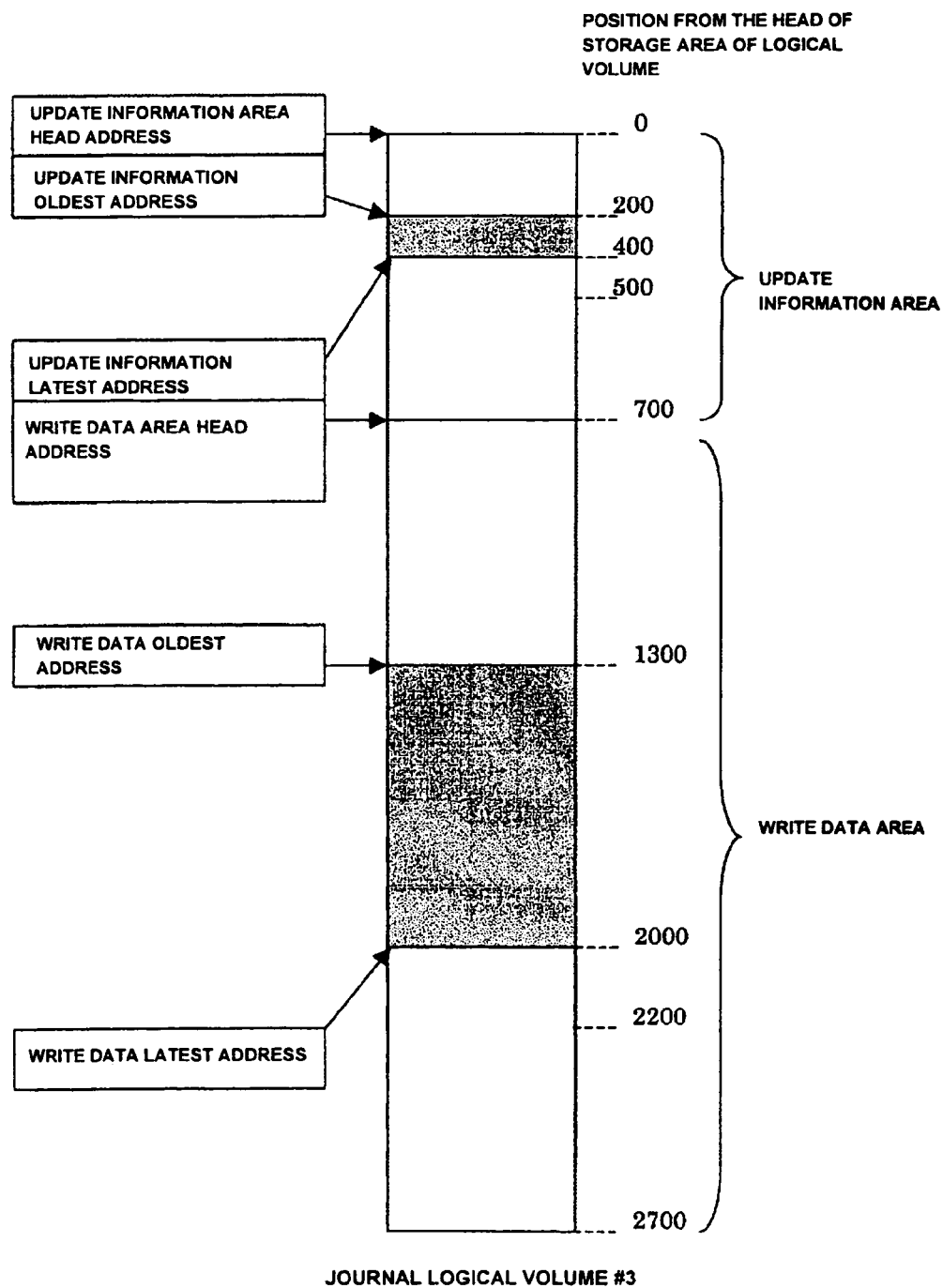
FIG. 30 is a diagram illustrating the structure of a journal logical volume according to one embodiment of the present invention.
Figure 35:
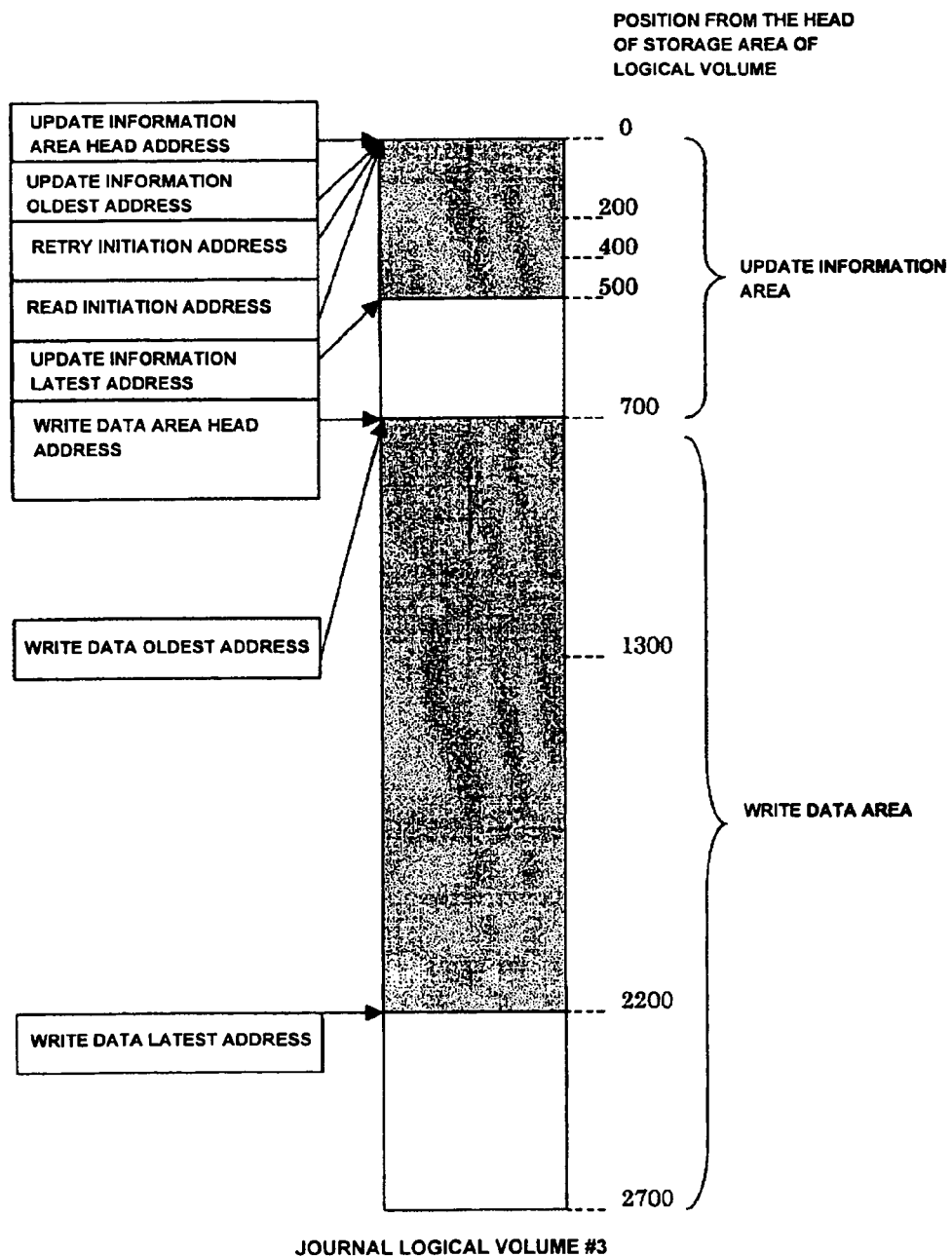
FIG. 35 is a diagram illustrating the structure of a journal logical volume according to one embodiment of the present invention.

In the following description, FIG. 4 shows the volume information, FIG. 5 shows the pair information, FIG. 6 shows the group information, FIG. 7 shows the pointer information, and FIG. 8 shows a diagram illustrating the pointer information of the primary storage system 100A before it fails. FIG. 26 shows the volume information, FIG. 27 shows the pair information, FIG. 28 shows the group information, FIG. 29 shows the pointer information, and FIG. 30 shows a diagram illustrating the pointer information of the secondary storage system 100B (asynchronous replication) before the primary storage system 100A fails. Since the secondary storage system 100B performs asynchronous data replication, it may not have all the journals that the primary storage system 100A has (update numbers 3-5). In the present example, the secondary storage system 100B does not have the journal for the update number 5. FIG. 31 shows the volume information, FIG. 32 shows the pair information, FIG. 33 shows the group information, FIG. 34 shows the pointer information, and FIG. 35 shows a diagram illustrating the pointer information of the secondary storage system 100C (synchronous replication) before the primary storage system 100A fails. Since the secondary storage system 100C performs synchronous data replication, it has all the journals (update numbers 3-5) that the primary storage system 100A has.

(1) A failure occurs in the primary storage system 100A and the primary logical volumes (DATA 1, DATA 2) become unusable (step 2500).

(2) Using the maintenance terminal of the storage system 100C or the host computer 180C, the user instructs the storage system 100C to change the asynchronous replication source. The asynchronous replication source change command is a command to change the source of asynchronous data replication (i.e., the primary logical volume) on a group-by-group basis and includes replication source information (a storage system number C and a group number C that have the secondary logical volumes (data 1, data 2) in synchronous data replication) and replication destination information (a storage system number B and a group number B that have the secondary storage volumes (COPY 1, COPY 2) in asynchronous data replication) (step 2510).

(3) Upon receiving the asynchronous replication source change command, the storage system 100C refers to the volume information, pair information and group information of the storage system 100B and the storage system 100C; obtains a group number D whose group state is "blank" in the storage system 100C; and makes changes to the volume information, pair information and group information of the storage system 100C so that asynchronous data replication pairs would be formed with the logical volumes C (data 1, data 2) that belong to the group C in the storage system 100C as primary logical volumes and the logical volumes B (COPY 1, COPY 2) that belong to the group B in the storage system 100B as secondary logical volumes. However, the combinations of the logical volumes C and the logical volumes B are to be consistent with the pairs that are each formed with the logical volume A in the primary storage system 100A. Furthermore, the secondary storage system 100C changes group information such that the journal logical volume that used to belong to the group C would be continued to be used in the group D. More specifically, the storage system 100C changes the update number for the group D to the update number for the group C and the journal logical volume number for the group D to the journal logical volume number for the group C, and makes all items in the pointer information for the group D same as the pointer information for the group C. Through the asynchronous replication source change command, the storage system 100C changes the pair information for the storage system 100C shown in FIG. 32 to the pair information shown in FIG. 39, the group information for the storage system 100C shown in FIG. 33 to the group information shown in FIG. 40, and the volume information for the storage system 100C shown in FIG. 31 to the volume information shown in FIG. 38.

The storage system 100C commands the storage system 100B to change its pair information and group information so that asynchronous data replication pairs would be formed with the logical volumes C (data 1, data 2) that belong to the group C in the storage system 100C as primary logical volumes and the logical volumes B (COPY 1, COPY 2) that belong to the group B in the storage system 100B as secondary logical volumes. However, the combinations of the logical volumes C and the logical volumes B are to be consistent with the pairs that are each formed with the logical volume A in the primary storage system 100A.

The storage system 100B refers to the volume information, pair information and group information of the storage system 100B and the storage system 100C and makes changes to the pair information and group information of the storage system 100B. By changing the pair information for the group B shown in FIG. 27 to the pair information shown in FIG. 36, the group information shown in FIG. 28 to the group information shown in FIG. 37, and the state of the group information for the group B to "halted," the storage system 100B halts the journal read processing to the storage system 100A (steps 2530, 2540).

(4) The storage system 100C sends a response to the asynchronous replication source change command to either the host computer 180C or the maintenance terminal. The user recognizes the end of the asynchronous replication source change processing through the host computer 180C or the maintenance terminal and begins using the storage system 100C (steps 2550, 2560).

(5) The storage system 100B sends a journal read position designation command to the storage system 100C (step 2570). The journal read position designation command is a command to change the pointer information of the group D of the storage system 100C and to designate a journal that is sent based on a journal read command from the storage system 100B; the journal read position designation command includes a partner group number D and an update number B. The partner group number D designates the partner group number for the group number B. The update number designates a numerical value resulting from adding 1 to the update number in the group information for the group number B. In the example shown in FIG. 37, the partner group number 2 and the update number 5 are designated.

(6) Upon receiving the journal read position designation command, the storage system 100C refers to the pointer information 700 and checks whether there is a journal for the update number B. The storage system 100C reads the update information of the update information oldest address in the pointer information from at least one storage device 150 and obtains the oldest (smallest) update number C.

If the update number C is equal to or less than the update number B in the journal read position designation command, which indicates that the storage system 100C has the journal for the update number B, the storage system 100B can continue with the asynchronous data replication. In this case, the storage system 100C frees storage areas for journals that precede the update number B, changes the read head address and the retry head address to addresses for storing the update information for the update number B, and sends "resumption possible" to the storage system 100B. Through this, the pointer information shown in FIG. 34 is changed to the pointer information shown in FIG. 41 (step 2580).

On the other hand, if the update number C is greater than the update number B in the journal read position designation command, which indicates that the storage system 100B does not have the journal required by the storage system 100C, the storage system 100B cannot continue the asynchronous data replication. In this case, data replication must be initiated based on the procedures described using FIGS. 9 and 10 from the primary storage system 100C to the secondary storage system 100B.

(7) Upon receiving the "resumption possible" response, the storage system 100B resumes a journal read processing to the storage system 100C by changing the state of the group information for the group B to "normal" (step 2590).

The storage system 100B does not have to issue a journal read position designation command. In this case, the storage system 100B initiates a journal read processing and receives the oldest journal from the storage system 100C. If the update number C of the journal received is greater than a numerical value resulting from adding 1 to the update number in the group information for the group number B (the update number B), which indicates that the storage system 100C does not have the journal required by the storage system 100B, the storage system 100B halts the data replication process. If the update number C of the journal received is less than the update number B, which indicates that the storage system 100B already has the journal, the storage system B cancels the journal and continues the journal read processing. If the update number C of the journal received is equal to the update number B, the storage system B stores the journal received in the journal logical volume and continues the journal read processing.

An operation to reflect data update to the primary logical volume (data 1) of the primary storage system 100C on the secondary logical volume (COPY 1) of the secondary storage system 100B after the host computer 180C begins to use the storage system 100C is generally described using FIG. 42.

(1) Upon receiving a write command from the host computer 180C for data in the primary logical volume (data 1), the primary storage system 100C updates data in the primary logical volume (data 1) and stores journals in the journal logical volume (jnl 1) through the command reception processing 210 and the read/write processing 220, and reports the end of the write command to the host computer 180C (4200 in FIG. 42).

(2) The secondary storage system 100B reads journals from the primary storage system 100C through the journal read processing 240 and stores the journals in the journal logical volume (JNL 2) through the read/write processing 220 (4210 in FIG. 42).

(3) Upon receiving a journal read command from the secondary storage system 100B, the primary storage system 100C reads the journals from the journal logical volume (jnl 1) and sends the journals to the secondary storage system 100B through the command reception processing 210 and the read/write processing 220 (4210 in FIG. 42).

(4) The secondary storage system 100B uses the pointer information 700 through the restore processing 250 and the read/write processing 220 to read the journals from the journal logical volume (JNL 2) in ascending order of update numbers and updates data in the secondary logical volume (COPY 1) (4220 in FIG. 42). As a result, data in the primary logical volume (data 1) in the primary storage system 100C and data in the secondary logical volume (COPY 1) in the secondary storage system 100B match completely some time after the update of the primary logical volume.

In the data processing system according to the present invention described above, the storage system C uses update numbers and update times from the storage system A to create journals. If the storage system A, which is the subject of data replication, fails and information processing is continued using the storage system C, the storage system B changes the journal acquisition source from the storage system A to the storage system C. As a result, the storage system B can continue to replicate data of the storage system A, while maintaining data integrity. Furthermore, management information for managing journals does not rely on the capacity of data that is the subject of replication.

Figure 48:
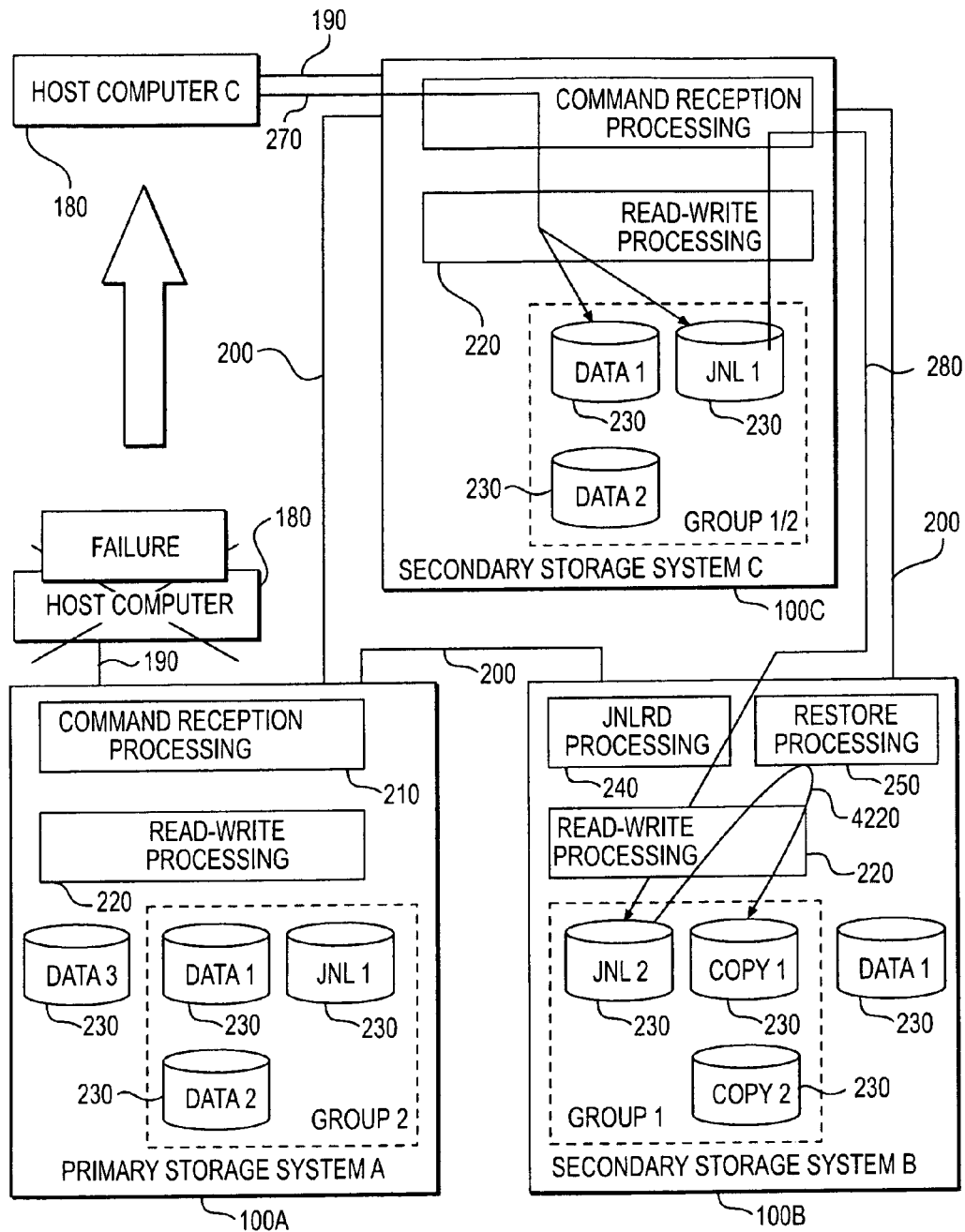
FIG. 48 is a block diagram illustrating the operation that takes place in the event a host computer 180 fails according to one embodiment of the present invention.

A description will be made as to the procedure for using the host computer 180C and the storage system 100C to resume the information processing performed by the host computer 180 and to resume data replication on the storage system 100B in the event the host computer 180 fails. A block diagram of the logical configuration of the procedure is shown in FIG. 48. The difference between this situation and the situation in which the primary storage system 100A fails is that since the storage system 100A can be used, synchronous data replication is performed by the storage system 100A, in addition to the asynchronous data replication on the storage system 100B.

In the following description, FIG. 4 shows the volume information, FIG. 5 shows the pair information, FIG. 6 shows the group information, FIG. 7 shows the pointer information, and FIG. 8 shows a diagram illustrating the pointer information of the primary storage system 100A before the host computer 180 fails. FIG. 26 shows the volume information, FIG. 27 shows the pair information, FIG. 28 shows the group information, FIG. 29 shows the pointer information, and FIG. 30 shows a diagram illustrating the pointer information of the secondary storage system 100B (asynchronous replication) before the host computer 180 fails. Since the secondary storage system 100B performs asynchronous data replication, it may not have all the journals that the primary storage system 100A has (update numbers 3-5). In the present example, the secondary storage system 100B does not have the journal for the update number 5. FIG. 31 shows the volume information, FIG. 32 shows the pair information, FIG. 33 shows the group information, FIG. 34 shows the pointer information, and FIG. 35 shows a diagram illustrating the pointer information of the secondary storage system 100C (synchronous replication) before the host computer 180 fails. Since the secondary storage system 100C performs synchronous data replication, it has all the journals (update numbers 3~5) that the primary storage system 100A has.

(1) A failure occurs in the host computer 180.

(2) Using the maintenance terminal of the storage system 100C or the host computer 180C, the user issues the asynchronous replication source change command, described earlier, and a synchronous replication exchange command to the storage system 100C. The synchronous replication exchange command is a command to reverse the relationship between the primary logical volume and the secondary logical volume in synchronous data replication on a group-by-group basis, and includes replication source information (a storage system number A and a group number A that have the primary logical volumes (DATA 1, DATA 2) in synchronous data replication) and replication destination information (a storage system number C and a group number C that have the secondary storage volumes (COPY 1, COPY 2) in synchronous data replication).

(3) Upon receiving the synchronous replication exchange command, the storage system 100C refers to the volume information, pair information and group information of the storage system 100C, and makes changes to the volume information, pair information and group information of the storage system 100C so that synchronous data replication pairs would be formed with the logical volumes A (DATA 1, DATA 2) that belong to the group A in the storage system 100A as secondary logical volumes and the logical volumes C (COPY 1, COPY 2) that belong to the group C in the storage system 100C as primary logical volumes. However, the combinations of the logical volumes A and the logical volumes C must be logical volumes that already formed pairs in synchronous data replication.

The storage system 100C commands the storage system 100A to change its volume information, pair information and group information so that synchronous data replication pairs would be formed with the logical volumes A (DATA 1, DATA 2) that belong to the group A in the storage system 100A as secondary logical volumes and the logical volumes C (COPY 1, COPY 2) that belong to the group C in the storage system 100C as primary logical volumes. However, the combinations of the logical volumes A and the logical volumes C must be logical volumes that already formed pairs in synchronous data replication. Furthermore, the storage system 100C commands the storage system 100A to create a journal whenever data in a secondary logical volume in a synchronous data replication pair is updated. In the storage system 100A, the journal logical volume for storing journals is, for example, the journal logical volume (JNL 1) that was used for asynchronous data replication in the storage system 100A before the host computer 180 failed.

The storage system 100A refers to the volume information, pair information and group information of the storage system 100A and makes changes to the volume information, the pair information and group information of the storage system 100A. After making changes to information for the storage system 100A and the storage system 100C is completed, the storage system 100C sends a response to the synchronous replication exchange command to the host computer 180C or the maintenance terminal.

Through the asynchronous replication source change command and the synchronous replication exchange command, the storage system 100C changes the pair information for the storage system 100C shown in FIG. 32 to the pair information shown in FIG. 43, the group information for the storage system 100C shown in FIG. 33 to the group information shown in FIG. 44, and the volume information for the storage system 100C shown in FIG. 31 to the volume information shown in FIG. 38.

Through the asynchronous replication source change command, the storage system 100B changes the pair information for the storage system 100B shown in FIG. 27 to the pair information shown in FIG. 36 and the group information for the storage system 100B shown in FIG. 28 to the group information shown in FIG. 37.

Through the synchronous replication exchange command, the storage system 100A changes the pair information for the storage system 100A shown in FIG. 5 to the pair information shown in FIG. 46, the group information for the storage system 100A shown in FIG. 6 to the group information shown in FIG. 47, and the volume information for the storage system 100A shown in FIG. 4 to the volume information shown in FIG. 45.

The user recognizes the end of the asynchronous replication source change and the synchronous replication exchange processing through the host computer 180C or the maintenance terminal and begins using the storage system 100C. The subsequent processing is the same as the processing that begins with step 2570.

In the data processing system according to the present invention, the storage system C uses update numbers and update times from the storage system A to create journals. If the host computer fails and another host computer continues information processing using the storage system C, the storage system B changes the journal acquisition source from the storage system A to the storage system C. As a result, the storage system B can continue to replicate data of the storage system A while maintaining data integrity. Furthermore, by changing settings so that the storage system A can synchronously replicate data of the storage system C, both the synchronous and asynchronous data replication can be performed as before the host computer failed.

While the description above refers to particular embodiments of the present invention, it will be understood that many modifications may be made without departing from the spirit thereof. The accompanying claims are intended to cover such modifications as would fall within the true scope and spirit of the present invention.

Japanese patent application No. 2003-183734 filed in Japan on Jun. 27, 2003, Japanese patent application No. 2003-050244 filed in Japan on Feb. 27, 2003, and U.S. patent application Ser. No. 10/603,076 filed in the U.S. on Jun. 23, 2003, which are technology of remote copy, are incorporated herein.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A data processing method in a system having a first storage system that is configured to couple to a host device and configured to send and receive data to and from the host device; a second storage system that is coupled to the first storage system and configured to receive data from the first storage system; and a third storage system that is coupled to the first storage system and configured to receive data from the first storage system, wherein the first storage system includes a first storage area that is configured to store data written from the host device, and a second storage area that is configured to store the data written from the host device and update information relating to a write order of the data, the data processing method comprising the steps of:
transmitting, by the first storage system, the data to the second storage system synchronously with receiving the data from the host device, and transmitting the data and the update information relating to the write order of the data to the third storage system asynchronously with receiving the data from the host device,
storing, by the second storage system, the data received from the first storage system in a third storage area, and storing data received from the first storage system and update information relating to the write order of the data in a fourth storage area in order to transmit the data and the update information stored in the fourth storage area to the third storage system in case of failure of the first storage system, storing, by the third storage system, the data and the update information read from the second storage area in a fifth storage area and storing the data included in the fifth storage area in a sixth storage area according to the update information included in the fifth storage area, and writing, by the third storage system, the data and the update information received from the first storage system in the fifth storage area, and writing the data stored in the fifth storage area in the sixth storage area according to the update information stored in the fifth storage area.

2. A data processing method according to claim 1, further comprising the steps of:

requesting, by the first storage system upon receiving from the host device a data write request to write data, the second storage system to write the data therein, and notifying, after receiving a write response from the second storage system, the host device of a completion of the data write request, and writing, by the first storage system, in the first storage area the data written from the host device, and writing in the second storage area the data written from the host device and the update information relating to the write order of the data.

3. A data processing method according to claim 2, further comprising the step of:

generating, by the first storage system, upon receiving from the host device the data write request, an update number that is used for identifying the write order of the data, and including the update number in a data write request that is sent to the second storage system, wherein the update information written in the fourth storage area of the second storage system includes the update number received from the first storage system.

4. A data processing method according to claim 2, further comprising the steps of writing, by the second storage system upon receiving from the first storage system a data write request, in the third storage area the data received from the first storage system, writing in the fourth storage area the data received from the first storage system and the update information relating to the write order of the data, and sending a response to the first storage system.

5. A data processing method according to claim 1, further comprising the step of, reading, by the third storage system, at specified time intervals from the first storage system the data and the update information stored in the second storage area.

6. A data processing method according to claim 1, further comprising the step of:

generating, by the first storage system upon receiving a data write request from the host device, an update number that is used for identifying the write order of the data, wherein the update information written in the second storage area in the first storage system includes the update number generated by the first storage system.

7. A data processing method according to claim 1, wherein the update information written in the fifth storage area in the third storage system includes an update number that is used for identifying the write order of the data.

8. A data processing method according to claim 1, wherein the first storage system includes a plurality of first storage areas, and wherein the update information written in the second storage area includes an update number used for identifying write order of data written in the plurality of first storage areas.

9. A data processing method according to claim 1, wherein the second storage system includes a plurality of third storage areas, and wherein the update information written in the fourth storage area is created for data that is written in the plurality of third storage areas.

10. A data processing method according to claim 1, wherein the update information written in the second storage area in the first storage system includes an update number that is generated by the first storage system to be used for identifying the write order of the data, the update information written in the fourth storage area in the second storage system includes the update number included in the update information written in the second storage area, and the update information written in the fifth storage area in the third storage system includes the update number included in the update information written in the second storage area.

11. A data processing method according to claim 1, further comprising the step of transmitting, by the third storage system, a read request to the first storage system, and in response to the read request, transmitting, by the first storage system, the data and the update information stored in the second storage area to the third storage system.

12. A data processing method according to claim 1, further comprising the steps of:

transmitting, in case of failure of the first storage system, the data and the update information, which are not received by the third storage system before the failure but stored in the fourth storage area of the second storage system before the failure, from the fourth storage area of the second storage system to the third storage system, storing the data and the update information received from the second storage system in the fifth storage area of the third storage system, and storing the data included in the first storage area in the sixth storage area of the third storage system according to the update information included in the fifth storage area.

13. A data processing method according to claim 12, wherein in the update information, which the third storage system reads from the second storage area of the first storage system, a number indicating the write order of the data is included, and wherein in case of failure of the first storage system, the data and the update information, which the third storage system does not read from the first storage system before the failure, are specified by using a number included in the update information, which the third storage system reads from the second storage area of the first storage system before the failure.

14. A data processing method according to claim 1, further comprising the steps of:

transmitting in case of failure of the first storage system, the data and the update information stored in the fourth storage area of the second storage system to the third storage system, and storing the data transmitted from the fourth storage area to the third storage system in the sixth storage area of the third storage system in an order related to the write order of the data based on the update information transmitted from the fourth storage area.

15. A data processing method according to claim 14, further comprising the step of:
  receiving the data stored in the fourth storage area of the second storage system, which is transmitted to the third storage system and stored in the sixth storage area of the third storage system in the order related to the write order of the data, by the second storage system from the first storage system before the failure of the first storage system.

16. A data processing method according to claim 1,
  wherein each of the first storage system, the second storage system, and the third storage system includes at least one disk, and each of the first storage area, the third storage area, and the sixth storage area is a logical volume configured by a disk.

17. A data processing method according to claim 16,
  wherein the second storage area is a logical volume configured by a disk.

18. A data processing method according to claim 17,
  wherein each of the fourth storage area and the fifth storage area is a logical volume configured by a disk.

19. A data processing method in a system having a first storage system that is configured to couple to a host device and configured to send and receive data to and from the host device; a second storage system that is coupled to the first storage system and configured to receive data from the first storage system; and a third storage system that is coupled to the first storage system and configured to receive data from the first storage system, wherein the first storage system includes a first storage area that is configured to store data written from the host device, and a second storage area that is configured to store the data written from the host device and update information relating to a write order of the data,
  the data processing method comprising the steps of:
  transmitting, by the first storage system, the data to the second storage system synchronously with receiving the data from the host device, and transmitting the data and the update information to the third storage system asynchronously with receiving the data from the host device,
  storing, by the second storage system, the data received from the first storage system in a third storage area, and storing the data received from the first storage system and update information relating to the write order of the data in a fourth storage area in order to transmit the data and the update information stored in the fourth storage area to the third storage system in case of failure of the first storage system,
  storing, by the third storage system, the data and the update information read from the second storage area in a third storage area, and storing the data included in the fifth storage area in a plurality of sixth storage areas according to the update information included in the fifth storage area, and
  writing data stored in the fifth storage area in the plurality of sixth storage areas according to the update information stored in the fifth storage area.

* * * * *

UNITED STATES PATENT AND TRADEMARK OFFICE
CERTIFICATE OF CORRECTION

PATENT NO. : 7,447,855 B2
APPLICATION NO. : 11/581413
DATED : November 4, 2008
INVENTOR(S) : Kazuhito Suishu et al.

It is certified that error appears in the above-identified patent and that said Letters Patent is hereby corrected as shown below:

On the title page, (60) should read:

(60) Continuation of application No. 11/334,511, filed Jan. 19, 2006, now Pat. No. 7,143,254, which is a "division" --continuation-- of application No. 10/784,356, filed Feb. 23, 2004, now Pat. No. 7,130,975.

In the specification, column 1, lines 9-15, should read:

The present application is a continuation application of application Ser. No. 11/334,511, filed Jan. 19, 2006 now U.S. Pat. No. 7,143,254, which is a "divisional" --continuation-- application of application Ser. No. 10/784,356, filed Feb. 23, 2004 now U.S. Pat. No. 7,130,975, and claim the benefit of foreign priority of Japanese Application No. 2003-316183, filed Sep. 9, 2003, the contents of which are incorporated herein by reference.

Signed and Sealed this
Eleventh Day of September, 2012

David J. Kappos
*Director of the United States Patent and Trademark Office*